United States Patent
Giorgianni et al.

(10) Patent No.: US 7,064,830 B2
(45) Date of Patent: Jun. 20, 2006

(54) DENTAL COLOR IMAGING SYSTEM

(75) Inventors: Edward J. Giorgianni, Rochester, NY (US); Alexander G. Forsythe, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 459 days.

(21) Appl. No.: 10/460,693

(22) Filed: Jun. 12, 2003

(65) Prior Publication Data
US 2004/0252303 A1 Dec. 16, 2004

(51) Int. Cl.
*G01J 3/46* (2006.01)
*A61C 3/00* (2006.01)

(52) U.S. Cl. .................. 356/402; 356/405; 433/26; 433/37

(58) Field of Classification Search ............... 356/402, 356/405, 425; 433/26, 37, 203.1, 215, 218, 433/223; 358/504, 518, 520; 345/426, 427
See application file for complete search history.

(56) References Cited

U.S. PATENT DOCUMENTS

| | | | |
|---|---|---|---|
| 4,428,029 A | 1/1984 | Baliozian | |
| 5,448,381 A * | 9/1995 | Bohan et al. ............... | 358/527 |
| 5,515,485 A * | 5/1996 | Luquet et al. .............. | 345/632 |
| 5,759,030 A | 6/1998 | Jung et al. .................. | 433/29 |
| 5,766,006 A * | 6/1998 | Murljacic .................... | 433/26 |
| 5,961,324 A | 10/1999 | Lehmann ..................... | 433/26 |
| 6,007,332 A * | 12/1999 | O'Brien ........................ | 433/26 |
| 6,008,905 A | 12/1999 | Breton et al. | |
| 6,132,210 A | 10/2000 | Lehmann ..................... | 433/26 |
| 6,190,170 B1 | 2/2001 | Morris et al. ................ | 433/215 |
| 6,206,691 B1 | 3/2001 | Lehmann et al. ............ | 433/26 |
| 6,210,159 B1 * | 4/2001 | Lehmann et al. ............ | 433/26 |
| 6,254,385 B1 | 7/2001 | Jung et al. | |
| 6,305,933 B1 | 10/2001 | Lehmann ..................... | 433/26 |
| 6,328,567 B1 | 12/2001 | Morris et al. ................ | 433/215 |
| 6,358,047 B1 | 3/2002 | Lehmann ..................... | 433/26 |
| 6,384,917 B1 | 5/2002 | Fradkin ....................... | 356/402 |
| 6,561,800 B1 * | 5/2003 | Lehmann ..................... | 433/26 |
| 6,575,751 B1 | 6/2003 | Lehmann et al. | |
| 6,726,476 B1 * | 4/2004 | Jung et al. ................... | 433/26 |
| 6,786,726 B1 * | 9/2004 | Lehmann et al. ........... | 433/223 |
| 6,832,913 B1 * | 12/2004 | Lehmann ..................... | 433/26 |
| 6,867,864 B1 * | 3/2005 | Overbeck et al. ........... | 356/402 |
| 6,925,205 B1 * | 8/2005 | Leedham et al. ............ | 382/167 |
| 6,950,189 B1 * | 9/2005 | Jung et al. ................... | 356/419 |
| 2002/0012895 A1 | 1/2002 | Lehmann ..................... | 433/26 |
| 2002/0021439 A1 | 2/2002 | Priestley et al. ............ | 356/243.5 |
| 2002/0064751 A1 | 5/2002 | Lehmann | |

FOREIGN PATENT DOCUMENTS

| | | |
|---|---|---|
| DE | 196 12 250 A1 | 3/1996 |
| EP | 1 155 663 A2 | 11/2001 |
| EP | 1 262 751 A2 | 12/2002 |
| JP | 2003-121898 | 4/2003 |
| WO | WO 00/63661 | 10/2000 |
| WO | WO 02/12846 A1 | 2/2002 |
| WO | WO 02/099369 A2 | 12/2002 |

* cited by examiner

*Primary Examiner*—Layla G. Lauchman
(74) *Attorney, Agent, or Firm*—David M. Woods; Nelson Adrian Blish

(57) ABSTRACT

A method for determining visual calorimetric values for an object having particular spectral reflectance characteristics comprises the steps of: (a) photographing an object with an electronic image capture device to form device image values; (b) selecting a transform from a plurality of transforms for converting device image values to visual colorimetric values, wherein the selection of the transform is based on the particular spectral reflectance characteristics of the object; and (c) applying the selected transform to the device image values to determine the visual colorimetric values for the object.

27 Claims, 8 Drawing Sheets

FIG. 2A1
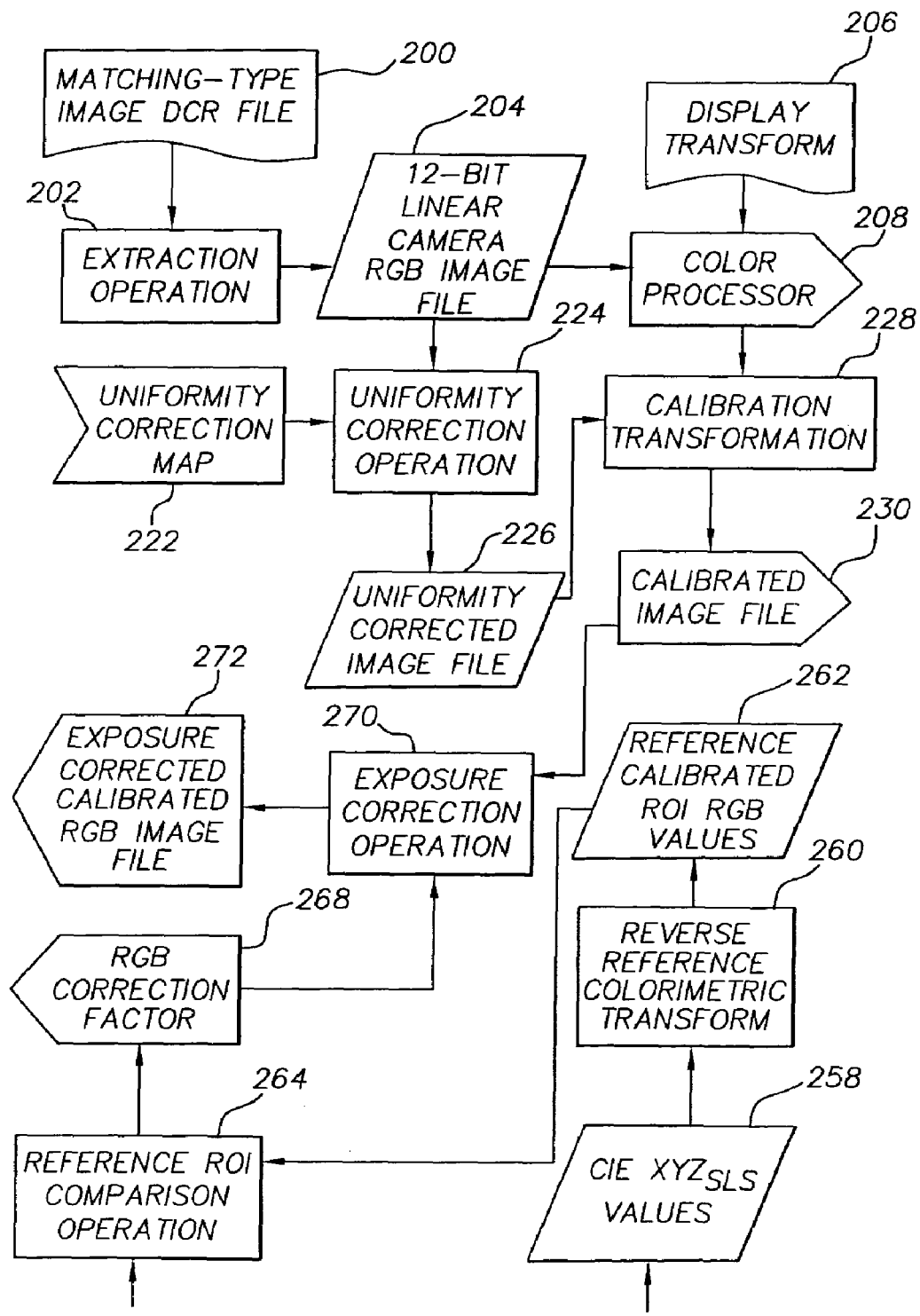

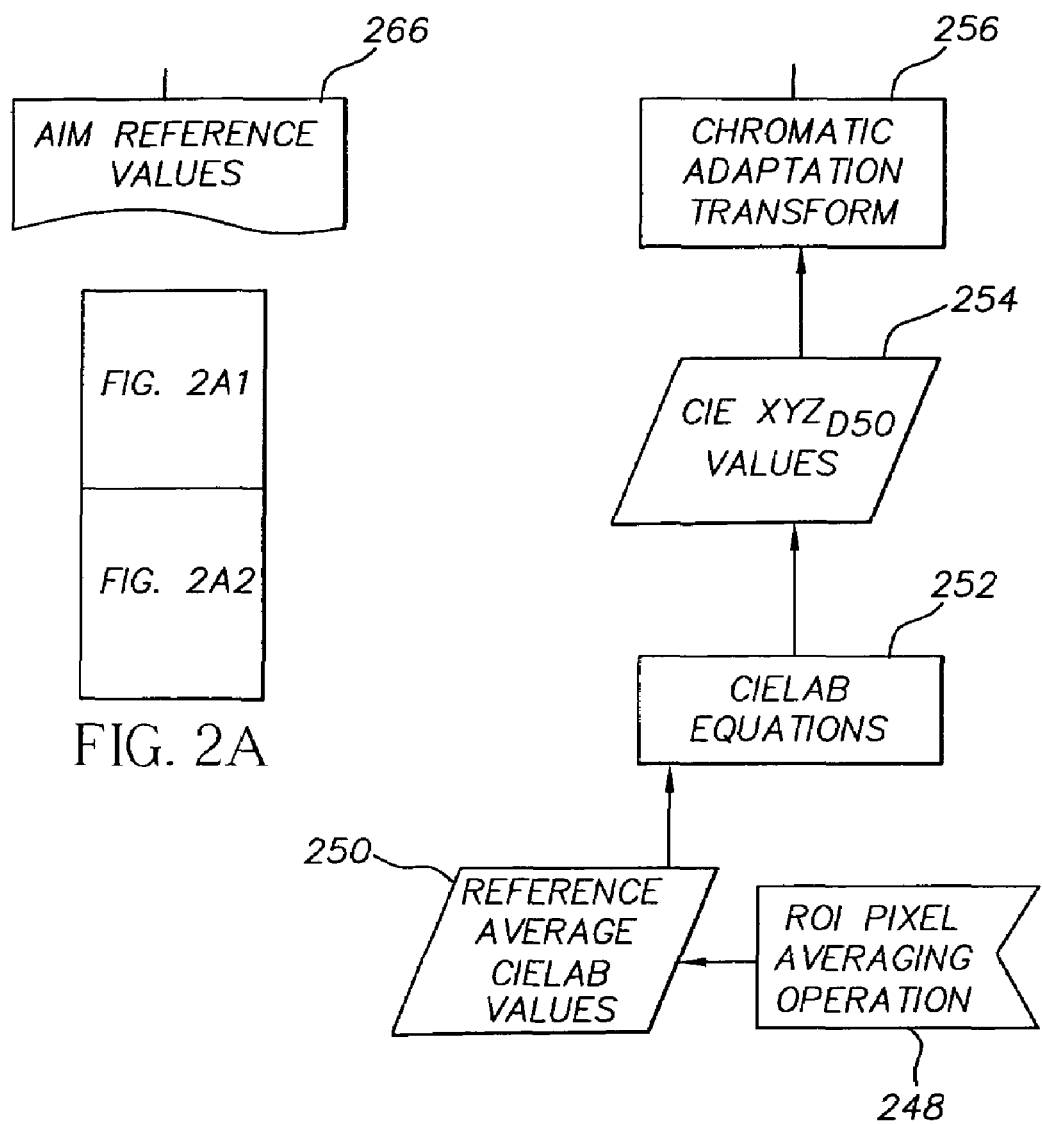

DENTAL COLOR IMAGING SYSTEM

FIELD OF THE INVENTION

This invention relates generally to methods and systems for dental color applications. In particular, it relates to a digital photographic method and system for producing high quality dental images and further relates to a method and system for determining, specifying, and conveying shade information for natural teeth, reference shade samples, and fabricated dental prostheses.

BACKGROUND OF THE INVENTION

Modern dental procedures often involve the fabrication of restorations such as crowns, implants, fixed partial dentures, and veneers. Ceramics are often used in such restorations because their optical properties are such that skillfully produced ceramic restorations can closely match the shape, texture, color and translucency of natural teeth.

Producing such realism involves a considerable degree of skill. Moreover, it requires that accurate information regarding the color and other appearance characteristics of a patient's teeth is accurately determined and unambiguously conveyed to those who will be fabricating the restoration. While molds and other techniques can be used to record and transfer information regarding tooth shape and other geometric characteristics, techniques for determining and conveying color and other appearance characteristics are more problematic.

The most widely used techniques for determining and communicating tooth color information have changed little in the past seventy years. Typically, the process (referred to as "shade matching") involves visually matching a patient's tooth to one of a number of reference shade samples (shade tabs) within one or more sets of standardized shade guides. The person performing the match, often a dentist, records the identification of the matching shade tab and conveys that information to the dental laboratory where the restoration will be fabricated. The laboratory then uses its own set of the same shade guides to perform visual color evaluations of the restoration throughout the fabrication process.

The visual shade matching process has a number of problems: The initial matching procedure is often long, difficult, and tedious. It is not unusual for the process to take twenty minutes or longer. In most cases, there will be no shade tab that perfectly matches the patient's teeth. Deciding which tab matches most closely (i.e., which mismatches the least) is often difficult. Frequently, the dentist will determine that the patient's teeth are particularly difficult to match. The patient then must go in person to the orthodontics laboratory that will be fabricating the restoration. There, trained laboratory personnel can perform the color match. In many cases, the patient will have to return to the dentist and laboratory two, three, or even more times as the color of the prosthesis is fine tuned by sequential additions of ceramics or other colored materials.

Despite the time and effort of all involved, the visual color matching procedure still fails (i.e., the prosthesis is rejected for color by the dentist and/or the patient) in about 10% of cases. Given the difficulty of the task, this rate of failure is not at all surprising. Visual color evaluation of relatively small color differences is always difficult, and the conditions under which dental color evaluations must be made are likely to give rise to a number of complicating psychophysical effects such as local chromatic adaptation, local brightness adaptation, and lateral-brightness adaptation. Moreover, shade tabs provide at best a metameric (i.e., non-spectral) match to real teeth; thus the matching is illuminant sensitive and subject to variability due to normal variations in human color vision (e.g., observer metamerism).

The difficulties associated with dental color matching have led to the development of a number of systems that attempt to replace visual assessments with those determined by various types of spectrophotometric and colorimetric instruments. Although the idea of basing shade matching on objective measurements rather than on subjective visual color assessments seems appealing, such measurements are extremely difficult to perform in practice. As a result, reports gathered from dentists and dental laboratory personal suggest that the level of performance of currently available instrument-based shade matching systems is not entirely acceptable. Uncertainties resulting from available instrument-based systems generally require that traditional visual assessments still be performed for verification. Thus, much of the value of such systems is largely negated.

The failures and limitations of currently available shade-matching systems, both instrument-based and visual-based, can best be understood by examining the difficulties involved in matching the appearance of human teeth. First, tooth color is a complex interaction of reflection, transmission, refraction, fluorescence, and scattering by a variety of organic and inorganic components. It is influenced by variations in tooth pulp volume, dentin condition, enamel composition, and other variations in the composition, structure, and thickness of the dental tissues. One result of this complexity is that color appearance and color measurement are greatly influenced by lighting geometry, surrounding colors, and other environmental factors.

A further complication is that color generally is not uniform within a single tooth. Color non-uniformities may result from spatial variations in composition, structure, thickness, internal and external stains, surface texture, fissures, cracks, and degree of wetness. As a result, measurements based on relatively large areas produce averaged values that may not be representative of a tooth's dominant color. In addition, natural color variations and non-uniformities make it unlikely that a given tooth can be matched exactly by any single shade tab. This means that a method for conveying the distribution of color within a tooth, not just its average color, is required. Tooth color also is seldom uniform from tooth to tooth. Therefore, the ideal color of a restoration may not be an exact match to that of an adjacent tooth or to any other single tooth in a patient's mouth. Dentists use the word "harmony" to describe how a restoration should appear to blend with the various colors of a patient's teeth. The ideal color of a restoration may, for example, be somewhere between that of several nearby teeth, or it may be closer to the color of a similar tooth elsewhere in the mouth.

A further difficulty is that successful color communication requires that tooth color can be measured and specified according to a set of absolute reference color standards, such as numeric calorimetric values or reference shade tab identifiers. It is particularly important that the luminance factor is determined and conveyed accurately; yet the luminance factor generally is the most difficult aspect of color to measure. Furthermore, error tolerances for all aspects of tooth color are extremely small. In the mouth, a reconstruction such as a single crown is immediately adjacent to natural teeth. This proximity makes even small color errors very apparent. Moreover, people generally are particular about the appearance of their teeth. Understandably, they are quite intolerant of restorations that appear inappropriate in color.

Lighting is an additional source of difficulty in performing dental color measurements. The type of lighting, the lighting geometry, and other factors must be appropriate for measurement purposes. In particular, specular reflections from the tooth surface must be avoided. At the same time, however, the measurement conditions must be consistent with those under which the results ultimately will be judged. These two needs are often in conflict; optimum conditions for making dental measurements generally are quite different from those of the real world.

Additionally, visual color assessments and objective measurements must be determined in an inherently difficult environment, i.e., the mouth of a live patient. Factors such as hygiene, aesthetics, and patient comfort are important and must be considered in the design of the assessment or measurement techniques. Speed is also a concern. If the patient's mouth is open, the teeth begin to dry in a relatively short period of time. This drying changes the relative refractive index of the surface, which lightens and desaturates the apparent color of the teeth. Instrument measurements or visual matches made under such conditions likely will lead to poorly matched prostheses.

Color assessments, specifications and communication are further complicated by a lack of accurate color calibration within the dental industry. For example, our studies have shown that there can be considerable variation among supposedly identical sets of shade tabs from the same manufacturer. These variations make color communication based on such tabs ambiguous. For example the matching shade tab selected by a dentist may differ from the actual tab that will be used for reference at the laboratory fabricating the prosthesis, even though both tabs have the same identification and are assumed to be identical. As a result, a prosthesis built to match the color of the laboratory's shade tab will not match the color intended by the dentist. It would be valuable, then, for both the dentist and the dental laboratory to have a reliable and unambiguous means for specifying color. In addition, it would be valuable for the dentist and/or dental laboratory to have a means for verifying that a restoration meets a prescribed shade specification. At a dental laboratory, it would also be valuable to have a verification process incorporated in the fabrication process to provide shade guidance at intermediary stages of that process. Color adjustments then could be incorporated in subsequent fabrication stages.

Although a number of shade-matching systems have been described in the prior art, none fully addresses all the issues addressed above. For example, in a series of patents including U.S. Pat. Nos. 6,358,047, 6,305,933, 6,206,691, 6,132, 210, and 5,961,324 Lehmann et al. describe a tooth shade analyzer system-in which the preferred embodiment is based on the use of an intra-oral camera providing red, green, and blue (RGB) color values that are subsequently normalized and then used to derive hue, saturation, and intensity (HSI) values using a single set of RGB-to-HSI conversion equations. The derived HSI values are then compared to those derived from corresponding RGB measurements taken of a collection of shade tabs. Similarly, in U.S. Pat. Nos. 6,190, 170 and 6,328,567, Morris et al. describe a system that uses two or more references to normalize RGB image values from one or more digital cameras. Again, teeth and shade tabs are compared according to their RGB values or to HSI or other values derived from RGB values using a single set of conversion equations. Again similarly, in U.S. Pat. No. 6,384,917, Fradkin describes a system that uses beam splitters and other optical components to obtain RGB image values. Once again, teeth and shade tabs are compared according to their RGB values or to HSI or other values derived from RGB values using a single set of conversion equations. In U.S. Patent Application Publication No. US2002/0021439A1, Priestley et al. also describes a color matching system in which colors are analyzed in terms of RGB values. The underlying assumption in all these descriptions is that the color of a tooth (i.e., its visual color appearance) can be matched by a shade tab having the same RGB values (or HSI or other values derived from those RGB values using a single set of conversion equations). However, that assumption is not generally true. The spectral reflectances of shade tabs differ from those of natural teeth; thus, visual matches between teeth and tabs are metameric-not spectral-matches. Furthermore, the spectral sensitivities of current digital cameras, including conventional and intra-oral cameras, are not equivalent to a set of visual color matching functions. As a result, matches determined from RGB measurements, or from HSI or other values derived by applying any given single set of conversion equations to measured RGB values, generally will not result in accurate visual matches. It is quite possible, for example, that a tooth and a shade tab may have identical RGB values, and thus identical derived HSI values; but they may not match visually. It is also quite possible that a tooth and a shade tab may have different RGB values, and thus different derived HSI values; yet they may match visually. Such occurrences are a consequence of the basic nature of metameric matching. In the present invention, it will be shown that this fundamental problem is overcome by the novel use of multiple subject-specific calorimetric transformations rather than any single set of conversion equations.

In U.S. Pat. No. 6,007,332, O'Brien describes a tooth color matching system based on producing a photograph image of a tooth together with a visually selected color standard, such as a dental shade tab, and analyzing the photographic image using a colorimetric or spectrophotometric device. Using colorimetric or spectrophotometric devices in this manner does not address the fundamental problems associated with the metamerism of natural teeth and shade tabs because the devices are used to analyze the color of the resulting photograph, not the color of the original tooth and shade tab. The color comparison therefore will be subject to metamerism problems resulting from the fact that, like digital cameras, photographic media have RGB spectral sensitivities that are not equivalent to a set of visual color matching functions. Thus a tooth and shade tab that match perfectly in the photographic image (visually, calorimetrically, and spectrally) still may not match visually in real life.

Other shade-measuring systems attempt to avoid issues related to metameric matching by using spectrophotometers or colorimeters for direct shade measuring. However, the geometry and other characteristics of the lighting used on such systems described in the prior art generally do not correspond to the lighting conditions under which teeth normally would be viewed. Spectrophotometric or colorimetric measurements made under non-representative lighting conditions may produce non-representative color values that result in unsatisfactory visual matches under normal viewing conditions. Moreover such systems do not provide images of the full mouth, or even of adjacent teeth. Thus, they do not provide information required to ensure a shade match that is harmonious in color with the surrounding teeth and mouth structure, nor do they convey other important information related to tooth appearance such as texture and gloss.

Some camera-based systems described in the prior art also rely on lighting that is not representative of the lighting conditions under which teeth normally would be viewed. For example, in U.S. Patent Application Publication No. 2002/0021439, Priestley et al. describe a system in which cross-polarization is used to reduce glare from the tooth front surface. Shade matches achieved under such lighting conditions may not necessarily match under more normal conditions. In U.S. Pat. No. 5,759,030, Jung et al. describe a method for determining optical characteristics of teeth in which light is provided by a central source fiber optic and detected by an array of perimeter receiver optics. Again, shade matches and other tooth characteristics determined under such lighting conditions may not necessarily correspond to those obtained under normal conditions.

Many systems described in the prior art require the use of an isolation sleeve or similar device to prevent ambient light from entering the system. The use of such devices raises concerns regarding patient comfort and hygiene. Finally, none of the described systems provides a method for accounting for the previously described color variations among sets of shade tabs, nor do they provide the novel visualization methods and other advantages that will be described in present invention.

SUMMARY OF THE INVENTION

In view of the foregoing, an object of the present invention is to provide an improved dental imaging system.

A further object of the present invention is to provide a dental imaging system incorporating a means for accurately determining and specifying tooth shades.

A further object of the present invention is to provide a dental imaging system that additionally provides a means for producing high quality images that appropriately represent and convey additional tooth appearance characteristics such as color variations, texture, gloss, transparency, and translucency.

A further object of the present invention is to provide a dental imaging system that provides methods and means for compensating for variations in system components and media.

A further object of the present invention is to provide a dental imaging system that provides methods and means for visualizing and adjusting the color of proposed prostheses.

A further object of the present invention is to provide a dental imaging system that provides methods and means for evaluating and verifying the color of manufactured prostheses.

The present invention is directed to overcoming one or more of the problems set forth above. Briefly summarized, according to one aspect of the present invention, a method for determining visual calorimetric values for an object having particular spectral reflectance characteristics comprises the steps of: (a) photographing an object with an electronic image capture device to form device image values; (b) selecting a transform from a plurality of transforms for converting device image values to visual colorimetric values, wherein the selection of the transform is based on the particular spectral reflectance characteristics of the object; and (c) applying the selected transform to the device image values to determine the visual colorimetric values for the object.

In a further aspect of the present invention, a method for determining and specifying one or more shades of a natural tooth by comparing visual colorimetric values of a measurement image of the tooth to a database of visual colorimetric values of reference shades comprises the steps of: (a) uniformly illuminating at least one natural tooth in a manner that minimizes or eliminates specular reflections for a front surface of the tooth; (b) including an intra-oral reference within the measurement image; (c) photographing the intra-oral reference together with the tooth with a digital camera to form camera image values; (d) using the camera image values for the intra-oral reference to correct the camera image values for errors in exposure due to lighting or camera variations, thereby providing corrected camera image values; (e) applying a transform based on the spectral reflectance characteristics of natural teeth to convert the corrected camera image values to visual colorimetric values; (f) specifying pixel locations corresponding to one or more areas of the tooth for which the one or more shades are to be determined; (g) comparing the visual calorimetric values for the pixel locations to the visual calorimetric values of the database of visual calorimetric values of reference shades; and (h) determining one or more reference shades based on their correspondence to the visual calorimetric values for the pixel locations corresponding to the one or more areas of the tooth.

In still further aspects of the present invention, methods are described for determining and specifying one or more shades of a dental prosthesis by comparing visual colorimetric values of a measurement image of the dental prosthesis to a database of visual calorimetric values of reference shades, and for determining visual calorimetric values of a reference shade sample, such as a dental shade tab, from a measurement image.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 2A and 2B are diagrammatic illustrations of the signal processing sequence used in preparing images for subsequent shade-match measurements.

DETAILED DESCRIPTION OF THE INVENTION

Because dental color image processing methods are well known, the present description will be directed in particular to elements forming part of, or cooperating more directly with, a method in accordance with the present invention. Elements not specifically shown or described herein may be selected from those known in the art. Certain aspects of the embodiment to be described may be provided in software. Given the method as shown and described according to the invention in the following materials, software not specifically shown, described or suggested herein that is useful for implementation of the invention is conventional and within the ordinary skill in such arts.

Figure 1:
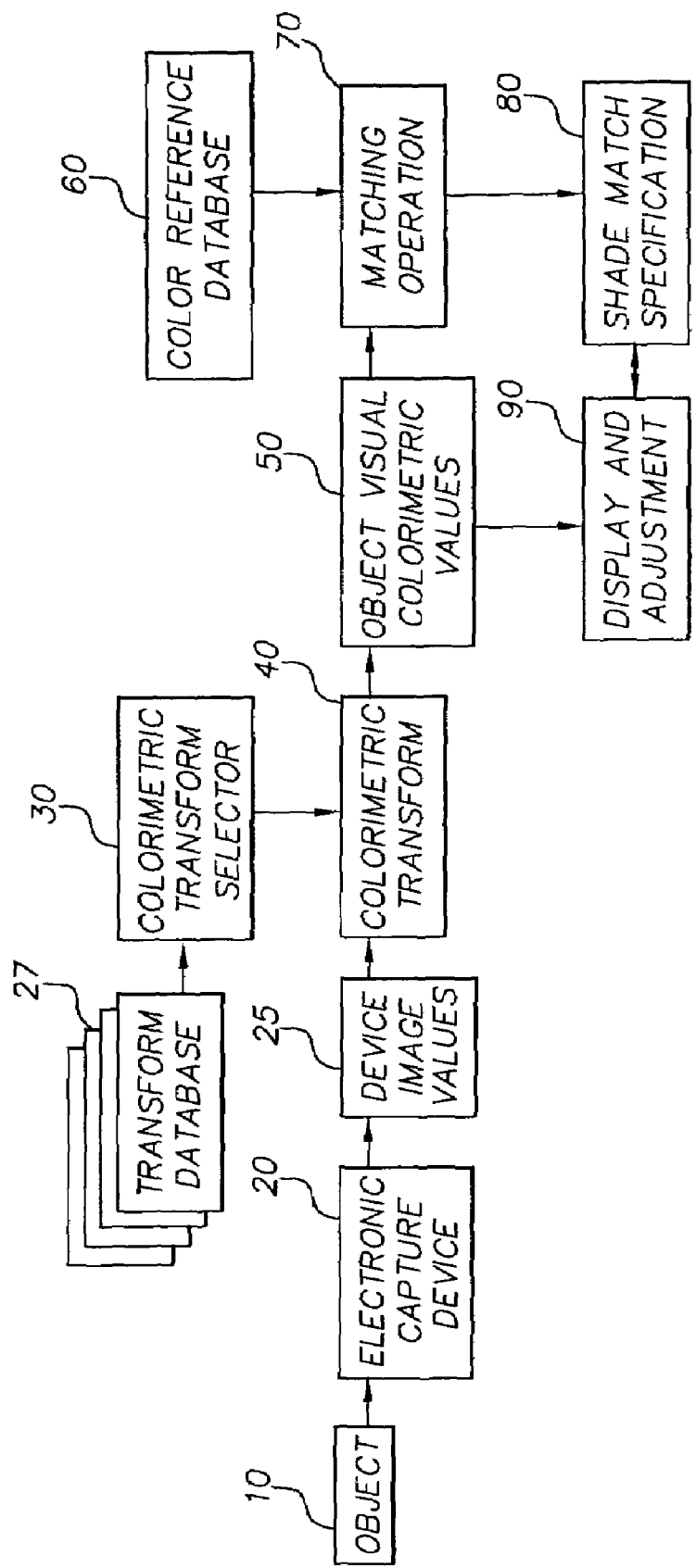
FIG. 1 is a diagrammatic illustration of the basic shade matching system of the invention.

The present invention describes a digital-camera-based dental imaging system in which all the above objects are realized. A diagrammatic illustration of the basic components and operations of the invention is shown in FIG. 1. An Object (10), for example, an illuminated tooth, a dental prosthesis, a shade tab or any other object for which a shade match is to be determined, is imaged by an Electronic Capture Device (20), which produces RGB Image Device Values (25). A Colorimetric Transform Selection operation (30) determines an appropriate mathematical transform from a Transform Database (27) for converting the RGB Device Image Values (25) from the capture device to visual calorimetric values. The selected transform is applied to the RGB Device Image Values (25) from the capture device by a Colorimetric Transformation (40), forming Object Visual Colorimetric Values (50). A Matching Operation (70) is then used to compare the formed object visual colorimetric values to visual calorimetric values for each of a plurality of color references (e.g., standard dental shade tabs) stored in a Color Reference Database (60), which results in a Shade Match Specification (80). Additionally, the visual colorimetric values of the object and those corresponding to the shade match specification may be used to form images for display, and the visual colorimetric values of the shade match specification may be adjusted using a Display and Adjustment Stage (90).

In practicing the invention, the dental shade matching system may be used without limitation to (a) determine and specify one or more shades of a natural tooth by comparing visual colorimetric values of a measurement image of the tooth to a database of visual colorimetric values of reference shades, (b) determine and specify one or more shades of a dental prosthesis by comparing visual calorimetric values of a measurement image of the dental prosthesis to a database of visual colorimetric values of reference shades, and (c) determine visual colorimetric values of a reference shade sample, such as a dental shade tab, from a measurement image.

Figure 5A:
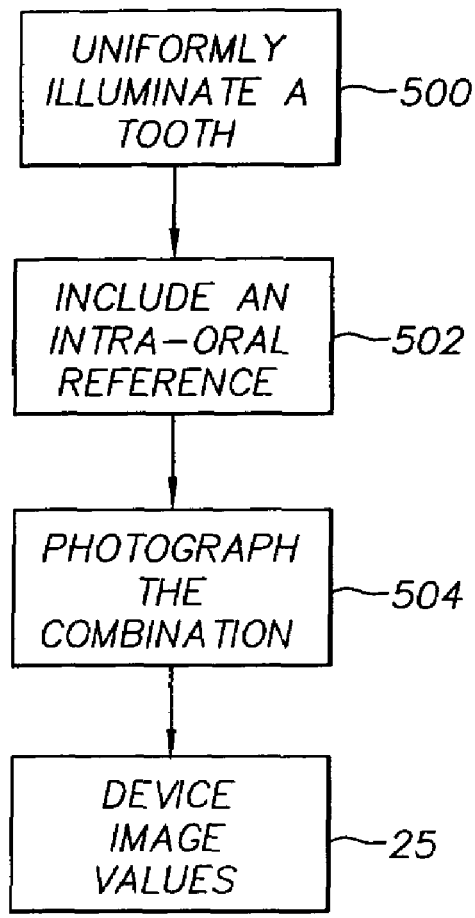
FIGS. 5A, 5B and 5C are diagrammatic illustrations of preferred setups of the dental shade matching system to (5A) determine and specify one or more shades of a natural tooth (5B) determine and specify one or more shades of a dental prosthesis and (5C) determine visual calorimetric values of a reference shade sample.
Figure 5B:
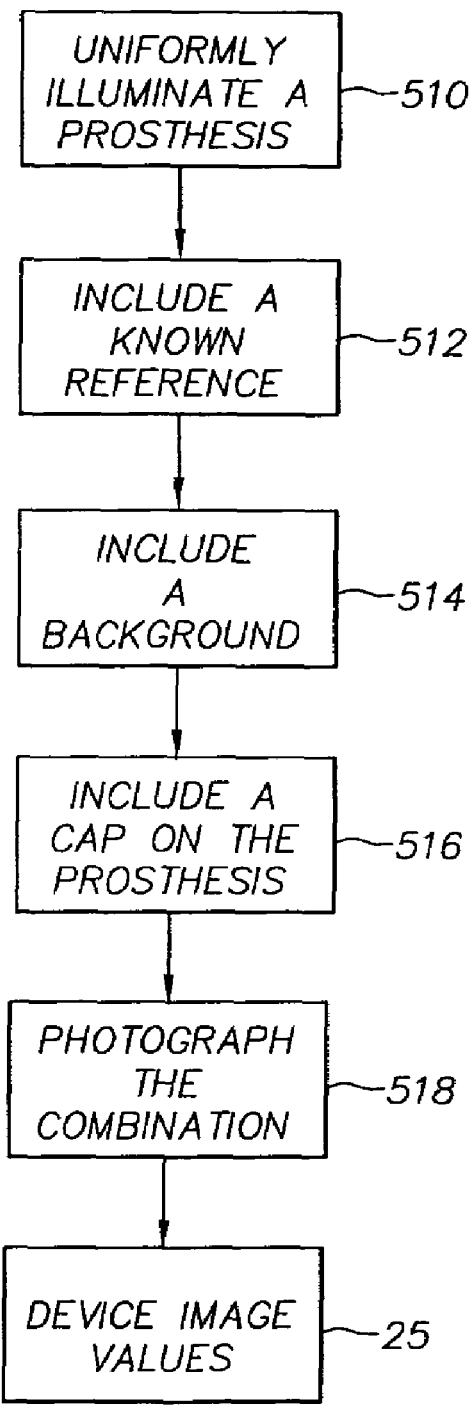

In employing the dental shade matching system according to the above-mentioned usage (a), and as further shown in FIG. 5A, at least one natural tooth is uniformly illuminated (500) in a manner that minimizes or eliminates specular reflections for a front surface of the tooth; an intra-oral reference is included (502) nearby the natural tooth within the measurement image; and the intra-oral reference is photographed (504) in combination with the tooth with a digital camera to form the Device Image Values (25). In employing the dental shade matching system according to the above-mentioned usage (b), and as further shown in FIG. 5B, a dental prosthesis is uniformly illuminated (510) in a manner that minimizes or eliminates specular reflections from a front surface of the dental prosthesis; a known reference is included (512) within the measurement image; a background is included (514) within the measurement image, wherein the background simulates the geometric and color characteristics of a human mouth; and a cap is included (516) on the dental prosthesis, wherein the cap simulates the geometric and color characteristics of human gums. Then the known reference is photographed (518) in combination with the dental prosthesis, background, and cap with a digital camera to form the Device Image Values (25).

Figure 5C:
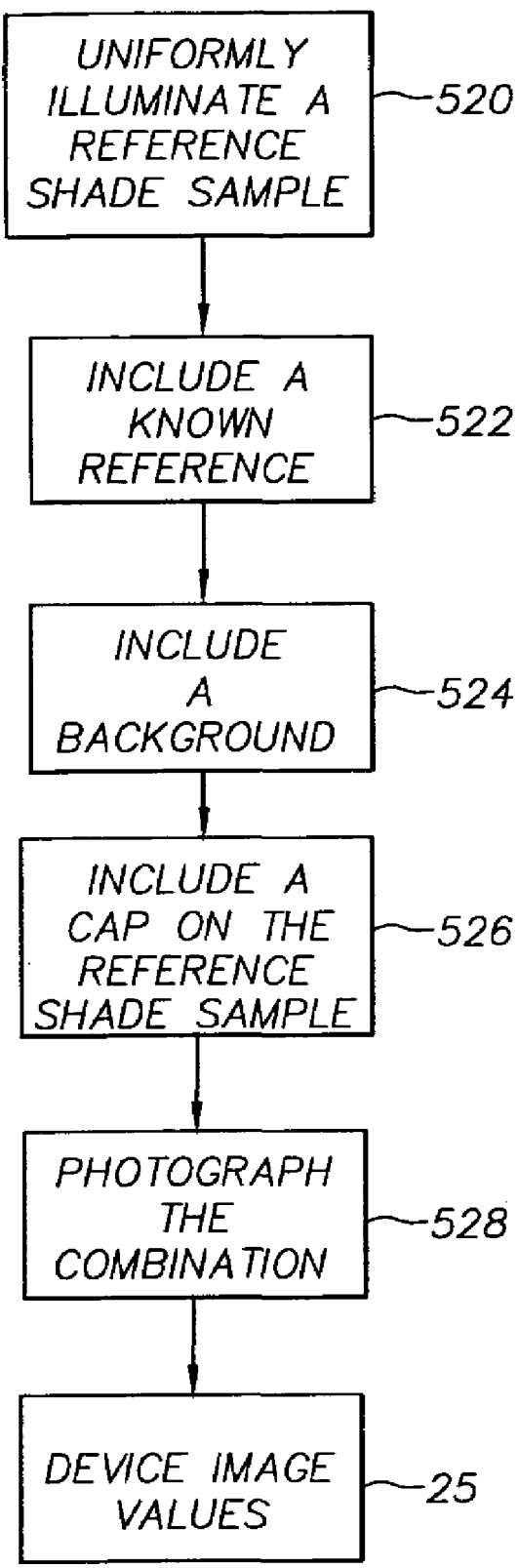

In employing the dental shade matching system according to the above-mentioned usage (c), and as further shown in FIG. 5C, a reference shade sample is uniformly illuminated (520) in a manner that minimizes or eliminates specular reflections from a front surface of the reference shade sample; a known reference is included (522) within the measurement image; a background is included (524) within the measurement image, wherein said background simulates the geometric and color characteristics of a human mouth; and a cap is included (526) on said reference shade sample, wherein the cap simulates the geometric and color characteristics of human gums. Then, the known reference is photographed (528) in combination with the reference shade sample, background, and cap with a digital camera to form Device Image Values (25).

Further details of the invention, the advantages of using the methods and means of the invention, and the advantages of a dental imaging system is which the above objects are realized next will be described in the context of a preferred embodiment of the invention. In this description, it will be shown that the invention addresses and provides solutions to the previously described problems associated with dental shade matching including the following: tooth complexity, tooth uniformity, tooth details and color harmony, absolute color measurement, color tolerances, lighting geometry, measurement environment, calibration, and verification.

In a preferred embodiment of the invention, the objects of the invention are realized in an appropriately designed color imaging system based on a digital photographic camera. The principal objective for the system is to meet or exceed the shade-matching accuracy, repeatability, and efficiency of highly experienced dental technicians.

The image capture device (20) used in this embodiment is a Kodak DCS760 camera. This camera provides manual controls and other preferred features, including 16-bit linear RGB output data. The system also includes a high quality flash unit incorporating two fiber optic bundles.

In use, the patient's chin is positioned on a provided rest, the patient's teeth are photographed, and software is used to determine colorimetry of one or more tooth areas of interest. Software is then used to compare tooth colorimetric values to a database of calorimetric values for one or more sets of dental shade tabs. The software includes one or more algorithm(s) for determining the closest matching shade tab(s) according to one or more defined sets of criteria. The software also provides multiple display modes, visualization modes, and other aids to facilitate shade matching assessment and adjustment.

It will now be shown how this system provides solutions to each of the previously described problems and difficulties associated with visual and instrument dental shade matching:

Tooth Complexity: Because tooth color results from a number of complex optical factors, it must be measured under realistic lighting conditions. At the same time, however, the lighting must be such that specular reflections from the glossy surface of a tooth are not present in the regions to be measured. In this preferred embodiment of the invention, the measurement lighting is arranged so as to eliminate such reflections. The lighting system is comprised of a high quality flash unit with two fiber optic bundles, each bundle having a diffuser for improved lighting uniformity, and each bundle positioned at an angle of substantially 30° to the plane of the tooth to be measured. This lighting arrangement greatly reduces and generally eliminates specular reflections within the ROI (region of interest) of the tooth to be measured, and it provides uniform illumination within that region. Preferentially, the shade matching software includes algorithms to identify and eliminate any small specular reflections that might occur within the image ROI. This can be accomplished using statistical and pattern recognition techniques well known to those skilled in the art.

Tooth Uniformity: Because tooth color generally is not uniform, it is advantageous to provide a means for recording and conveying the distribution of color within a measured tooth. In this preferred embodiment of the invention, colorimetry can be computed for individual image pixels or for groups of pixels within specified regions of interest. Thus the shade match can be determined for virtually any number of regions of a tooth. For example, a given tooth can be specified by a best single shade tab match, by two different matches corresponding to the upper and lower halves of the tooth, by three different matches corresponding to the gingival, middle, and incisal areas of the tooth, or by matches to any other number of regions selected automatically or according to user specifications. The software of the system also facilitates visual comparison of various shade tab selections to the tooth being matched by providing side-by-side or split-image displays of the tooth and shade tab(s). Such comparisons greatly simplify the task of visually matching non-uniform teeth with shade tabs, which are themselves non-uniform. The software also allows color adjustments to be made to displayed shade-tab images. Such adjustments preferably are input in a color space familiar to most dental practitioners. In this preferred embodiment, color adjustments are input in terms of value (lightness), chroma, and hue, although various other color spaces also may be appropriate. The user task of making these adjustments is greatly simplified and enhanced in this preferred embodiment by providing three modes of image display: a monochrome (black-and-white) mode, an enhanced chroma mode, and a normal color mode. Use of a monochrome mode greatly simplifies the task of judging and/or adjusting value, because hue and chroma differences are temporarily eliminated. Use of a mode in which image chroma is increased greatly simplifies the task of judging and/or adjusting hue. This mode is especially useful in situations where the chroma of the tooth being matched is low, because the assessment of hue is difficult when chroma is low. The chroma increase may be applied to an entire image; alternatively, it may be applied selectively to the specific areas being evaluated within an image. In cases where the chroma increase is applied to an entire image, it may be preferable to increase the chroma differentially such that the chroma of lower-chroma colors (including the teeth) is increased while the chroma of higher-chroma colors (such as lips and gums) is increased to a lesser degree or not at all. This differentiation prevents the creation of image displays in which all colors appear overly enhanced or distorted.

In this preferred embodiment, value and hue normally would be adjusted first, using the appropriate respective display enhancement modes. That would leave only chroma as the remaining variable, which can then be adjusted readily using the normal color display mode. In this preferred embodiment, the task of making color evaluations and adjustments is augmented by providing a means for placing the displayed objects being evaluated, such as a tooth and a shade tab, in close proximity. This can be done in various ways including, but not limited to, cutting a portion of a tooth image and pasting it on images of one or more shade tabs or forming one or more split images. For example, the display might show one or more images in which one half is a tooth image and the other half is an image of a shade tab to which the tooth is being compared. As another example, the display might show one or more images in which one half is a tooth image and the other half is an image of that tooth, but with color derived from a shade tab to which the tooth is being compared. Experienced dental personnel often find that certain color judgments, especially those involving value, are somewhat easier to make at greater viewing distances. For example, some workers prefer to perform shade tab evaluations at arms' length. Others may squint their eyes when making these comparisons. In this preferred embodiment, the task of making color evaluations and adjustments is further augmented by providing a means for simulating the effects of increased viewing distance and/or squinting. This can be done by various means including, but not limited to, decreasing the spatial resolution of the entire displayed image, decreasing the spatial resolution of the displayed image only in the areas being evaluated, or blurring the boundary between the components of a split image. After color adjustments are made, the software of the preferred embodiment provides updated colorimetric specifications corresponding to the modified colors of the matching shade tab image. This specification can be expressed in terms of calorimetric values and/or in terms of standard shade-tabs. For example, a shade-tab specification may indicate that the optimal shade-tab match would be a 60/40 mix of a VITA™ A2 and a VITA™ A3 shade tab.

Tooth Details and Color Harmony: In order to convey information regarding tooth details (such as gloss, texture, transparency, translucency, cracks, streaks, spots, stains, etc.), the relationships among the teeth, and the relationship of the teeth to the gums, the imaging system of this preferred embodiment provides one or more supplemental images in addition to the shade-matching image. The supplemental images may include close-ups of the area in which the restoration will be made plus other larger areas that include other teeth and surrounding structures. The shade-matching and supplemental images combine to form a comprehensive patient image record that can be stored, and/or displayed, and/or printed, and/or transmitted for use by dentists and laboratory personnel to determine restoration options, including various shade-matching options. In addition, the system software allows simulations of proposed restorations to be created and placed within a displayed image of the patient's mouth so that overall color harmony can be evaluated appropriately. In this preferred embodiment, a restoration simulation is created starting from a basic tooth image, which may be an image of a shade tab, an image of one of the patient's own teeth, or an image of a similar tooth stored in a database. The geometric properties of the basic tooth image are retained while the color properties are replaced with those of the specified shade tab(s) to create a simulation image of a proposed restoration. These color properties may be determined from shade matching a single tooth, or they may be derived from matching multiple teeth. For example, the color properties might be determined by averaging the visual colorimetric values determined for teeth on either side of the location of the restoration. The image of the simulated restoration can then be moved automatically or manually (e.g., by clicking and dragging) on the display screen and placed appropriately within an image of the patient's mouth. Preferably, the system software provides automatic adjustments and/or allows user adjustments to the size and shape of the simulated restoration so as to provide a realistic fit within the mouth image. Preferably, the system software also provides automatic adjustments and/or allows user adjustments to colors of the simulated restoration to provide the best color harmony within the mouth image. Alternative monochrome and chroma-boost image display modes, described previously, can be used to facilitate these adjustments. When such color adjustments are made, the software preferably provides updated calorimetric specifications corresponding to the modified colors. As before, the specification can be expressed in terms of calorimetric values and/or in terms of standard shade-tabs. Preferably, the restoration visualization process also includes software to simulate the addition of color details to a prosthesis. In the fabrication of an actual prosthesis, such addition would be done using pigmented ceramics to add small details such as maverick colors, bluish-tinted tooth edges, small areas of stain, and other realistic tooth details and characteristics. The provided simulation can include an assortment of virtual tools such as pens, brushes, colors palettes, etc., similar to those provided in many image editing program.

Absolute Color: In the dental industry, tooth color is generally described in terms of hue, value, and chroma. Accurate measurements of hue and chroma are comparatively easy to make. Hue and chroma are derived from chromaticity values, which are based on ratios of tristimulus values. Because they are based on ratios, hue and chroma measurements are unaffected by factors such as exposure time, camera aperture, lighting intensity, etc, that effect the absolute level of exposure. Value, however, which is derived from luminance and is a measure of lightness, is dependent on absolute captured signal levels. For example, a given set of RGB camera image code values (or CIE or other colorimetric values derived from those code values) could represent a correctly exposed image of an average tooth, an overexposed image of a darker tooth, or an underexposed image of a lighter tooth. Computations and experiments have shown that it would be extremely difficult to build an apparatus in which the lighting and camera exposure could be controlled to such a degree that calorimetric values derived from camera code values could be interpreted in absolute terms. In this preferred embodiment of the invention, the solution to this fundamental problem is based on the inclusion of a unique intra-oral reference within the measurement image. Values measured from this known reference are subsequently used to correct image values for errors in exposure resulting from lighting and/or camera variations. The novel characteristics of this reference and details related to its use will be discussed in more detail later.

Color Tolerance: Because error tolerances for tooth color are so small, color measurements must be both highly accurate and highly precise. The above mentioned intra-oral reference provides the basis for making highly accurate measurements, as will be discussed in detail later. A number of other factors also contribute to the overall color accuracy and precision of this preferred embodiment of the invention. These include camera characteristics, image data bit-depth throughout the signal processing chain, color signal transformations, and device/media calibration. Each will be discussed in more detail later.

Lighting Geometry: As previously discussed, for shade-matching measurement purposes the system of this preferred embodiment uses a very specific lighting geometry that provides uniform illumination and also minimizes specular reflections within the measured area. Lighting ratios and/or lighting geometry (distances and angles of incidence) can be altered, however, for photographing the previously described supplemental images. This capability provides distinct advantages over prior systems based on non-photographic methods, and it also provides distinct advantages over prior photographic systems in which a single lighting arrangement is used.

Measurement Environment: In addition to the normal considerations of colorimetric measurement, other factors such as hygiene, aesthetics, and patient comfort are important in dental imaging applications. Once again, the camera-based solution of this preferred embodiment provides a distinct advantage over other approaches. There is no contact between the measurement instrument (camera) and the patient. The only item that comes in contact with the patient is the intra-oral reference, which is small and easily sterilized using a conventional dental autoclave or an appropriate chemical treatment. The camera itself is located at a comfortable, non-intrusive distance from the patient. The flash exposure is very fast and powerful, so patient movement and ambient lighting are not concerns, and the flash is arranged so that light does not directly reach the patients eyes.

Calibration: The system described in this preferred embodiment of the invention has been designed to include calibration wherever needed. The image-processing paths, which will be discussed later, provide calibration transformations that compensate for variations in lighting, digital cameras, intra-oral references, and shade-tab sets. The novel provision for calibration of individual sets of shade tabs is of particular significance, because it eliminates a major source of ambiguity in dental color communication. The system also incorporates monitor and printer characterization and calibration procedures, well known to those skilled in the art, for routine system color management.

Verification: The system described in this preferred embodiment of the invention also provides novel subject-specific transformations that allow calorimetric measurements to be made from natural teeth, shade tabs, and prostheses. These subject-specific transformations are included to correct for color measurement errors resulting from the fact that digital camera spectral sensitivities differ from human visual color matching functions. In addition, other subject-specific transformations are provided to allow calorimetric measurements of various types of prostheses. This allows the system to be used to verify the colorimetry of a completed prosthesis. Measurements can also be made during the fabrication process, which provides guidance on how the color may need to be altered during subsequent stages of that process.

A system illustrative of this preferred embodiment of the invention will now be described in greater detail. In addition to a suitable means for performing the required signal process and numerical computations, the system consists of four principal components: A digital camera, a lighting system, an intra-oral reference, and a database comprised of shade tab images and their associated calorimetric values. Each of these components will now be described, beginning with a description of digital camera requirements and preferences.

The digital camera is preferably a single lens reflex (SLR), although other camera types having adequate means for previewing images also would be acceptable. The camera sensor is preferably at least 4 megapixels, with image quality at least equivalent to that of current charge-coupled devices (CCDs) of that size. The colorimetric performance must be at least equivalent to that of current RGB CCDs. The camera lens magnification preferably produces a full-mouth image at the sensor plane and provides a working distance of about 6 to 18 inches. The camera lens aperture is preferably f/16 or smaller in order to minimize the contribution of ambient light. The camera is preferably equipped with a PC flash cord connection or other means for synchronizing to an external flash unit, and the flash synchronization speed is preferably 1/125 sec. or faster in order to minimize the contribution of ambient light. Use of a small aperture and fast flash synchronization speed eliminates the need for an isolation sleeve or similar device to protect the system from ambient light. The camera preferably has manual settings for f-stop, shutter speed, ISO speed, white balance, and flash setup. The camera preferably has provision to supply output linear RGB data of at least 12 bits per channel. The camera preferably can use a docking station or other provision to allow easy insertion and removal of the camera from the system. This allows the camera to be used for other purposes, such as patient portrait and general photography, when desired.

In one implementation of this preferred embodiment of the invention, a Kodak DCS760 camera is used. Camera calorimetric performance (i.e., the accuracy with which camera RGB code values can be transformed into CIE colorimetric values) is of particular concern in this application. Ideally, the camera's spectral sensitivities would correspond exactly to a set of CIE visual color matching functions. At present, no digital camera meets this criterion. While the current degree of correspondence is quite adequate for most general photographic purposes, it is not sufficient for applications such as dental shade matching where visual colorimetric values must be determined with great accuracy.

However, the difficulties of transforming camera RGB values to visual colorimetric values can be greatly reduced if one recognizes that the important color stimuli involved in shade matching are divided into subsets that are well defined and quite restricted. For example, the spectral reflectances of most natural teeth generally exhibit similar basic characteristics. This would be expected since their coloration is primarily due to the same principal components (enamel, dentin, pulp, etc.). Similarly, particular classes of dental shade tabs and restorations also have restricted ranges and diversities of spectral reflectance distributions because they are fabricated from limited numbers of materials and colorants.

Unlike systems described in the prior art, the novel signal processing of the system described in this preferred embodiment of the invention takes advantage of these restricted spectral reflectance characteristics by using multiple calorimetric transformations (i.e., transformations for converting camera RGB values to visual calorimetric values), where each transformation is specific to the subject matter being measured. Use of such transformations results in significant improvements in the accuracy of the derived visual colorimetric values.

The fundamental improvement resulting from the use of subject-specific colorimetric transformations can be demonstrated by considering the consequences of visual metamerism in dental shade matching. Although natural teeth, dental shade tabs, and dental restorations each have restricted spectral reflectance characteristics, those characteristics are quite different from each other. Thus visual matches of teeth, tabs, and restorations are metameric and not spectral in nature. It is quite possible, for example, that a particular tooth and shade tab may be perfectly visually matched (i.e., they are a visual metameric pair). However, images of this metameric pair captured by a digital camera having spectral sensitivities that are not exactly equivalent to a set of visual color matching functions will not have equal sets of RGB values. Thus an analysis based on camera RGB values will incorrectly conclude that the tooth and tab do not match. Applying any single mathematical transformation to the tooth RGB values and the tab RGB values will not alter that incorrect conclusion. For example, if a single set of equations is used to transform both sets of RGB values to HSI, the resulting HSI values will still differ, thus incorrectly indicate a mismatch. Similarly, if a single matrix is used to transform both sets of RGB values to CIE XYZ tristimulus values, the resulting XYZ value will still incorrectly indicate that the tooth and tab do not match.

Use of the methods and means of the present invention overcomes this basic problem. In this example, the camera RGB values for the tooth image would be processed through a transformation derived specifically for objects having the spectral reflectance characteristics of natural teeth, while the camera RGB values for the shade tab image would be processed through a different transformation derived specifically for objects having the spectral reflectance characteristics of that particular type of shade tab. Thus when the RGB values for the tooth are processed though their appropriate transform, and the (different) RGB values for tab are processed though their (different) appropriate transform, the resulting colorimetric values (HSI, XYZ, CIELAB, etc.) will be equal, which correctly indicates that the tooth and shade tab are visually matched.

The fundamental improvement resulting from the use of subject-specific colorimetric transformations can also be demonstrated by considering the consequences of instrument metamerism in this application. It is quite possible that, when captured by a digital camera having spectral sensitivities that are not exactly equivalent to a set of visual color matching functions, a visually unmatched tooth and shade tab pair may produce images having equal sets of RGB values. This outcome is referred to as instrument metamerism. An analysis based on camera RGB values will incorrectly conclude that the tooth and tab visually match. Once again, applying any single mathematical transformation to both the tooth RGB values and the tab RGB values will not alter that incorrect conclusion. For example, if a single set of equations is used to transform the matching sets of RGB values to HSI, the resulting HSI values will still match, thus incorrectly indicating a visual match. Similarly, if a single matrix is used to transform both sets of RGB values to CIE XYZ tristimulus values, the resulting XYZ value will also incorrectly indicate that the tooth and tab are visually matched.

Use of the methods and means of the present invention again overcomes this basic problem. When the RGB values for the tooth are processed though their appropriate transform, and the (identical) RGB values for tab are processed though their (different) appropriate transform, the resulting colorimetric values (HSI, XYZ, CIELAB, etc.) will not longer be equal, which correctly indicates that the tooth and shade tab are not visually matched.

In the system of this preferred embodiment, unique digital camera colorimetric transformations are included for natural teeth and for various types of shade-tab and prosthetic materials. Such transformations can be developed using a number of techniques. For example, if the spectral sensitivities of the digital camera are known, RGB exposure values can be computed from the spectral reflectances of the subjects of interest and the spectral power distribution of the light source used for illumination. CIE or other calorimetric values can be computed from the same subject and illumination information, and a transformation can then be computed using numerical methods well known to those skilled in the art. Alternatively, camera RGB exposure values can be determined by photographing color targets comprised solely or primarily of color samples having the spectral reflectance properties of the subjects of interest. For example, a transformation for prosthetic colors for a particular ceramic system could be built by first forming a representative array of color samples using the ceramics, colorants, and other components of that system. The samples would then be photographed, and the RGB exposure values would be determined. These values, along with measured or computed visual calorimetric values for the color samples, would then be used to construct an appropriate mathematical transformation relating the RGB values to the visual colorimetric values. In addition to these subject-specific calorimetric transformations, other more generalized digital camera colorimetric transformations may be included in the system as well. In particular, the system of this preferred embodiment includes a colorimetric transformation, derived using a wide assortment of subject matter, that can be used for general imaging applications such as taking a patient's portrait for filing or insurance purposes.

The lighting used in this preferred embodiment of the invention meets a number of important criteria: As discussed above, the matching of natural teeth with shade tabs and prostheses is fundamentally metameric, not spectral. In addition, natural teeth and some ceramic materials exhibit fluorescence and other behaviors influenced by lighting characteristics. Therefore the spectral energy distribution properties of the light source used for shade matching must be representative of sources under which the quality of the prosthesis ultimately will be judged. For measurement purposes, the lighting must provide an area of illumination that is uniform in the plane of the target tooth and intra-oral reference. The illumination must also be sufficiently uniform in depth so that the front-to-back positioning of the target tooth is not overly critical. For measurement purposes, the lighting must minimize or eliminate specular reflections from the measurement areas of the target tooth and intra-oral reference. For measurement purposes, the lighting ideally should be repeatable in intensity and chromaticity from one exposure to the next. However, the use of an appropriate photographic reference and the exposure-compensation methods of this invention greatly reduce the requirements for such repeatability. The light available prior to exposure must be sufficient to allow proper positioning of the patient and focusing of the camera. Ideally, there should be a provision for previewing the lighting prior to camera exposure. The lighting system should not cause the patient discomfort. For example, it should not produce an undue amount of heat or noise. If flash is used, direct light from the flash should not reach the patient's eyes. Finally, the lighting geometry must be selectable and/or reconfigurable for photographing shade-measurement images as well as supplemental images that convey additional information such as gloss, texture, transparency, translucency, and maverick colors.

In this preferred embodiment of the invention, illumination is provided by a flash unit equipped with two fiber optics bundles. The power unit includes a tungsten lamp, which provides a constant source of light through the bundles. This allows positioning of the patient, focusing of the camera, and previewing of the lighting prior to camera exposure. The correlated color temperature is approximately 5000K. For shade measurement the lighting is arranged so as to eliminate specular reflections within the measurement areas of the target tooth and reference, to provide excellent two-dimensional uniformity, and to maintain this uniformity within a front-to-back distance of several inches. For photographing supplemental images, the lighting geometry can be altered so as to produce images that convey additional details of tooth gloss, texture, transparency, and translucency. In both the shade-measurement and supplemental geometry, the lighting pattern is restricted such that little or no direct light reaches the patient's eyes.

As discussed previously, accurate measurements of hue and chroma are comparatively simple to make because they are based on ratios of tristimulus values. Lightness measurements, however, are directly affected by factors such as flash duration, flash intensity, camera aperture, lighting geometry, etc. that affect the overall level of exposure. Although the preferred embodiment of the invention uses a very high quality camera and lighting system, exposure variations still occur. These variations would be considered very small by almost any standard, but they are still sufficiently large to cause unacceptable shade measurement errors.

In order to produce results comparable to those of skilled dental technicians, system exposure errors generally must be no greater than about one percent. To achieve this degree of exposure repeatability flash intensity, flash-to-tooth distance, and the tooth-to-camera distance would have to be controlled to tolerances that would be difficult to maintain under practical conditions. An alternative would be to monitor the factors affecting exposure and provide 1subsequent correction. For example, one could envision using a beam-splitter that would allow the flash intensity to be sampled and measured by the camera at the same time the image is captured. Controlling and/or monitoring the lighting, camera, and patient geometry, however, is more difficult.

In view of such difficulties, this preferred embodiment of the invention uses an intra-oral photographic reference. The purpose of this reference is to provide a means for subsequent correction of image values for exposure errors resulting from lighting and/or camera variations. This correction is done by first determining aim reference exposure values for a particular reference. These aim reference exposure values are determined by simultaneously photographing the reference together with a known reference, such as a spectrally nonselective reflector from which theoretical exposure values can be readily computed. (Note that the exposure values referred to here and throughout this application are exposure-factor values, i.e., they are normalized such that the exposure value from an ideal 100% diffuse reflector would be unity. Thus the red, green, and blue exposure values from an ideal 70% reflector, for example, would all be 0.70.)

In the preferred embodiment of the invention, aim exposure values for a particular intra-oral reference are used to normalize all images in which that reference is included. Because the normalization is trichromatic, it corrects for errors in color balance as well as overall exposure. The DCS760 camera used in this preferred embodiment system provides linear RGB exposure values, at a bit depth of 12 bits per channel. Other cameras may provide only nonlinear RGB values (usually at a bit depth of 8 bits per channel); however the nonlinear transform of such cameras can be readily characterized using techniques well known to those skilled in the art. Nonlinear RGB values from such cameras can then be converted to linear RGB values by applying an inverse of a camera's non-linear transform. Once the camera RGB exposure values are in linear form, the normalization process is simply an application of three (R, G, and B) scale factors, which are based on the aim and actual exposure values of the reference. For example, the normalized red exposure value for a given pixel would be calculated as follows:

$$RedEXP_{norm} = RedEXP_{actual} * RedREF_{aim} / RedREF_{actual}$$

where $RedEXP_{norm}$ is the normalized red exposure value for the pixel, $RedEXP_{actual}$ is the uncorrected red exposure value for the pixel, $RedREF_{aim}$ is the aim average red exposure value for the reference, and $RedREF_{actual}$ is the actual average red exposure value of the reference in the captured image. Normalized green and blue exposure values would be determined similarly.

The normalized image values represent the RGB values that would have been captured had the camera and lighting provided a perfectly exposed image. Although the concept of a reference is straightforward, the implementation of that concept is quite challenging. The design of the reference has to meet a number of somewhat conflicting criteria for photometric, physical, aesthetic, and hygienic properties. These criteria include the following: The front surface of the reference must reflect and scatter light in a way that is similar to the reflection and scattering of light by natural teeth; the presence of the reference must not interfere with the light reaching the measured tooth, nor should it influence the illumination or measurement of the tooth in any other way; the color of the reference should not be influenced by the color of nearby teeth and gums, nor should the color of the reference influence that of the tooth to be measured; the color of the reference must be stable over an extended period of time and must withstand repeated sterilization cycles; and the reference must be easy to position and comfortable for the patient to hold in his or her mouth.

Numerous types of references can be envisioned including, but not limited to materials that could be placed directly on the tooth being measured and various shaped objects, made from an assortment of materials, that could be held between the upper and lower teeth or temporarily cemented to one or more teeth. It is of particular importance that the light-reflecting properties of the front surface of the reference are very similar to those of the teeth being measured. For example, if the subject's head is turned such that the tooth being measured and the intra-oral reference are rotated off-angle to the camera, any changes in exposure resulting from this rotation must be equal for the tooth and reference. With such equality, normalization of the reference exposure values will result in an appropriate correction of the measured tooth exposure values.

In this preferred embodiment of the invention, the reference is comprised of a suitable support material and a front reflective surface built from metal and ceramic materials routinely employed in the fabrication of dental prostheses. The exposed front surface of the reference is a ceramic material normally used to cover the metal support used in metal-ceramic crowns. This ceramic material scatters light in a realistic way. The ceramic is coated on a metal backing that provides both mechanical support and opacity. The ceramic-coated metal is attached to a suitable holder, which provides comfortable upper and lower biting surfaces for the patient and which allows for proper positioning and alignment of the front surface. The reference components can be sterilized using standard dental sterilization solutions or standard dental steam autoclaves. The design of the reference preferably includes a narrow groove at or near the front of one biting surface. The tooth to be measured is positioned in this groove, which helps ensure proper front-to-back positioning of the reference in relation to that tooth. Various types of markers may be included on the surfaces of the reference. Such markers can aid in orientation and in applications such as automatic or manual detection of the reference within an image, automatic or manual detection of reference rotations and tilts, and automatic and manual camera focus. For calibration purposes, an identification marker (e.g., a bar code) can be used for automatic or manual identification of the specific reference being used.

In this preferred embodiment, one or more sets of standard dental shade tabs are used to provide a means for specifying and conveying tooth color. These shade tabs, made by a number of manufacturers, generally are designed to mimic the appearance of real teeth in size, shape, gloss, color variation, translucency, and transparency. Although these properties add realism that can be helpful for visual evaluations, they greatly complicate the measurement process. Photographing and measuring such shade tabs involves all the difficulties of photographing and measuring natural teeth, with the exception of dealing with a live patient. In particular, the lighting and lighting geometry used for such work must be appropriate. In this preferred embodiment, a special apparatus was designed and built for photographing shade tabs. A photographic reference, similar to that used in measuring natural teeth, is an integral part of the apparatus. The apparatus allows repeatable placement of a shade tab in relation to the lighting and to the photographic reference located below the tab. When the holder is properly adjusted, the relative positions of the lights, tab, and reference are the same as those used in photographing natural teeth. In this preferred embodiment, the apparatus was also used to measure the reflection spectrophotometry of a number of sets of tabs, including supposedly identical sets of the same type from the same manufacturer. These measurements produced two important and unexpected findings: First, it was determined that there were set-to-set color variations. These variations, while quite small by most standards, are quite significant for the intended application. Some variations are large enough to cause errors as large as a whole shade. This is an unexpected finding, given that such shade tabs are the basis for color specification and communication throughout the dental industry. As a result of this finding, the signal processing of this preferred embodiment, which will be described in detail later, includes calibration for each individual set of shade tabs. This novel calibration contributes significantly to the accuracy, precision, and lack of ambiguity of the color information specified and communicated by the system. As another result of this finding, the shade tab database of the preferred embodiment includes one or more sets of "virtual shade tab" images computed by averaging data imaged from multiple samples of actual shade-tab sets. These virtual shade tab images provide a permanent and unambiguous standard for communicating colors in terms of shade-tab specifications. For many applications, especially those involving multiple shade-matching systems, it would be feasible and advantageous to use such virtual shade tab standards in place of physical shade tab samples.

A second unexpected finding of our research was that the spectral reflectances of the measured shade tabs generally did not match those of natural teeth. Research on this subject determined that while other experimenters had obtained similar results, the spectral mismatch was generally presented as "evidence of metamerism". However, our measurements show that the spectral mismatches are more fundamental. In most cases, the measured shade tabs do not match the color of natural teeth, either spectrally or metamerically. In particular, the spectral reflectances of shade tabs are significantly lower than those of natural teeth at wavelengths longer than about 580 nm. The higher reflectance of natural teeth in this region is a characteristic of oxy-hemoglobin found in blood. Because real teeth are partially translucent, their color is strongly influenced by the color of the blood-rich pulp at their core. In addition, teeth tend to be somewhat transparent, especially at the incisal edge; so the color there is influenced by the color of the inside of the mouth. Similarly, shade tabs are somewhat translucent, and nearly transparent at the incisal edge; thus their color is influenced significantly by the color of the background on which they are viewed. In practice, highly skilled experienced dental laboratory personnel often position shade tabs such they are backed by the patient's open mouth (or, in some cases, the patient's lips). This makes the shade tabs look somewhat redder and closer in color to the teeth. Note that this is a physical, not psychophysical, effect. Reddish light from the patient's mouth or lips is transmitted through the tab and added to the light reflected from the front surface of tab. In view of this, the preferred embodiment of this invention includes a novel method for measuring shade tabs in a manner that is consistent with how they are used by experienced practitioners. Specifically, a specially designed background is used for performing photographic and spectrophotometric measurements of shade tabs. The geometric and spectral characteristics of this background emulate those of the human mouth. As a result, shade-tab photographs or measurements made using the background correspond to those that would have resulted had the shade tabs been photographed or measured in the average patient's mouth. The visual and instrument matching of shade tabs to natural teeth can be further enhanced if the shade tabs are also capped with a material simulating the appearance of human gums. In this preferred embodiment, the caps are fabricated from an appropriately colored dental silicone material. Various other suitable materials, such as plastics and waxes, also could be used. In this preferred embodiment, digital camera images are made of prostheses in order to verify their shade. The visual and instrument evaluation of such images are similarly improved by the use of a mouth-simulating background and gum-simulating caps on the prostheses.

Figure 3:
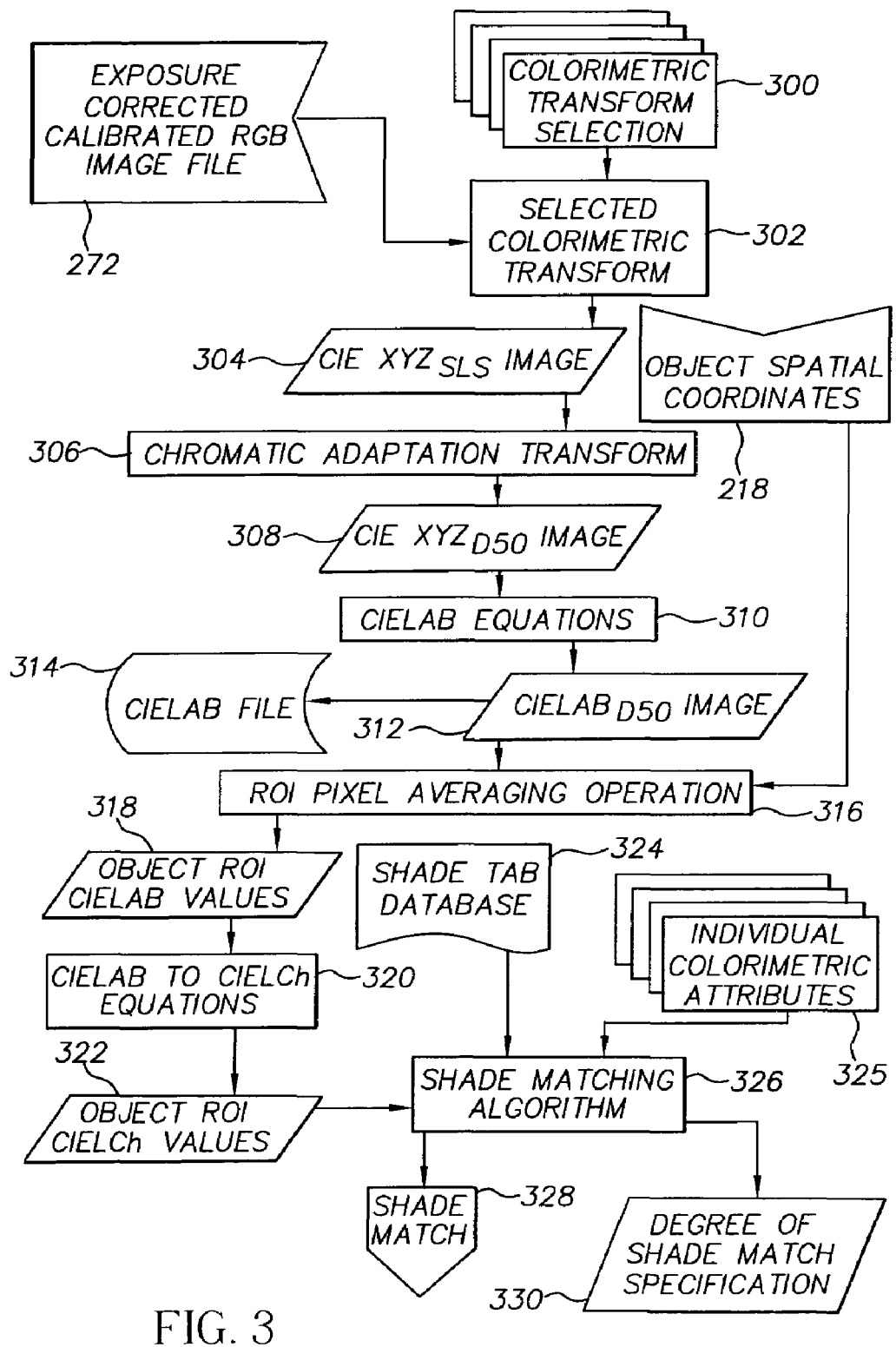
FIG. 3 is a diagrammatic illustration of the signal processing sequence used for determining shade matches.
Figure 4:
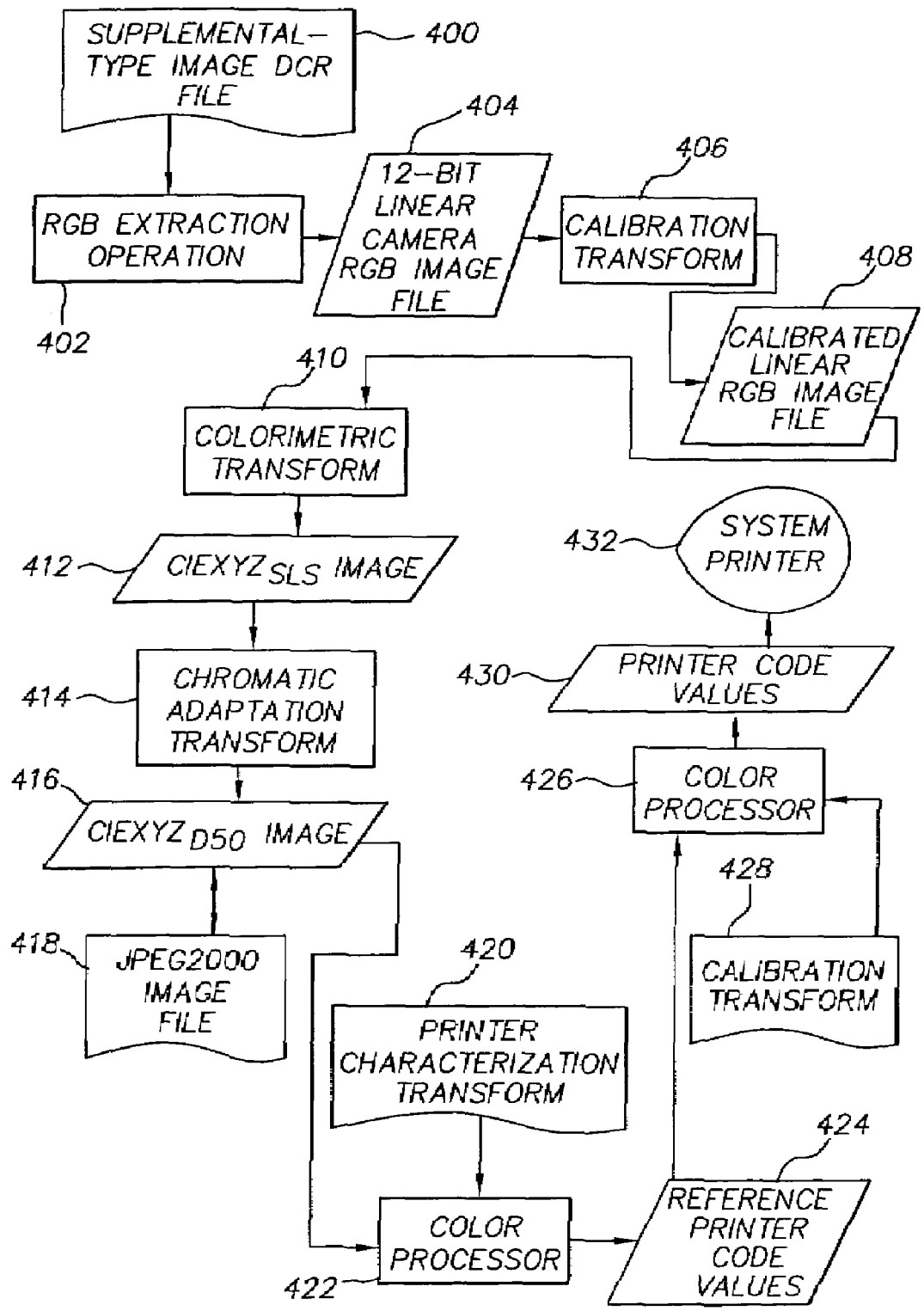
FIG. 4 is a diagrammatic illustration of the signal processing sequence used for producing reflection prints or other hard copy or electronic output of supplemental images.

Many of the described advantages of the preferred embodiment are incorporated and realized in its signal processing. The three principal signal-processing paths for the preferred embodiment are shown in FIGS. 2–4, and will now be discussed in detail.

Figure 2B:
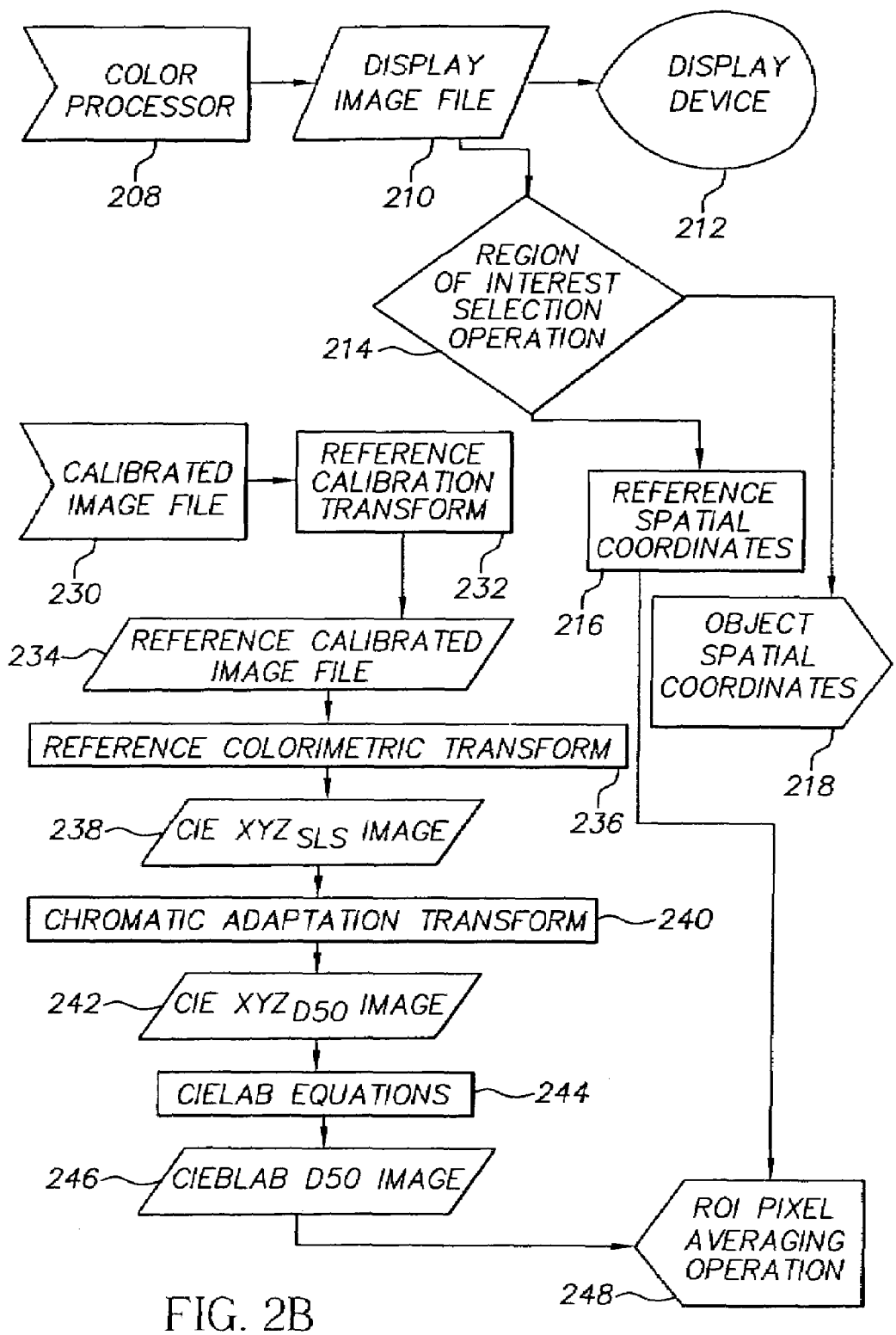

FIGS. 2A and 2B illustrate the signal-processing path for Shade-Measurement Image Preparation. The signal processing of this path is used in preparing shade-measurement images for analysis and visualization purposes. Such purposes include the shade matching of natural teeth, the shade verification of fabricated prostheses, the measurement of shade tabs for inclusion in a shade-tab database, the calibration of new intra-oral and other photographic references, the re-calibration of existing photographic references, and the performance of other measurements in which the colorimetry of a photographed object is to be determined by comparison to that of a known reference. The objective of the signal processing of this image preparation procedure is to produce an RGB image file that is corrected for unwanted variations in spatial and/or overall RGB exposures. This file, which is shown as an Exposure Corrected Calibrated RGB Linear Image File (272) in FIG. 2A, is used in the algorithmic determination of the shade match and for other purposes in which colorimetric measurements are required. The image file is also used to create display images for visual shade-match comparisons, assessments, and adjustments.

In this preferred embodiment, the Shade-Measurement Image Preparation process begins with a Matching-Type Image DCR File (200) obtained from the aforementioned DCS760 camera. In an Extraction Operation (202), 12-bit linear RGB data is extracted from the DCR file (200) to form a 12-bit Linear Camera RGB Image File (204). A Color Processor (208) is then used to apply a Display Transform (206) to the 12-bit Linear Camera RGB Image File (204) to form a Display Image File (210) containing RGB digital code values appropriate for display on a Display Device (212), which can be a conventional CRT monitor, an LCD display, or other appropriate form of electronic display or hardcopy printer. A Region of Interest Selection Operation (214) is used to select Reference Spatial Coordinates (216) of a region of interest (ROI) to be measured from the photographic reference and Object Spatial Coordinates (218) of one or more region(s) of interest to be measured from the tooth, prosthesis, shade tab, or other object being measured from the image. This ROI selection operation (214) can be fully automated by the use of color and pattern recognition techniques well known to those skilled in the art. Alternatively, the Display Image File (210) can be sent to the Display Device (212), and the Reference Spatial Coordinates (216) and the Object Spatial Coordinates (218) can be determined manually, or coordinate information that has been determined automatically can be displayed for verification and/or adjustment by a human operator.

A Uniformity Correction Map (222) is applied by a Uniformity Correction Operation (224) to the RGB Image File (204) values to form a Uniformity Corrected Image File (226). This two-dimensional RGB correction process adjusts the captured image file values to compensate for the net effect of RGB exposure variations due to spatial non-uniformities in lighting, camera lens fall-off, sensor non-uniformities, and other possible causes. The Uniformity Corrected Image File (226) is then processed through a Calibration Transformation (228), which compensates for RGB exposure variations resulting from differences among individual cameras and/or lighting systems. This operation transforms actual camera RGB exposure values to those that would have been formed by a mathematically defined reference camera and lighting system.

The resulting Calibrated Image File (230) is then processed through a series of transformations, the purpose of which is to determine the average linear RGB exposure values of the photographic reference, which are shown in FIG. 2A as Reference Calibrated ROI RGB Values (262), within the area specified by the reference ROI coordinates, i.e., the Reference Spatial Coordinates (216). These average linear RGB exposure values are used later in the normalization of the entire image. In the first step of the process to determine the average linear RGB values of the photographic reference, a Reference Calibration Transform (232) is used to transform the Calibrated Image File (230) RGB values to a Reference Calibrated Image File (234). The purpose of this transformation is to correct for any differences between the actual photographic reference being used and a standard reference upon which subsequent calorimetric transformations are based. A Reference Colorimetric Transform (236) is then used to transform the Reference Calibrated Image File (234) RGB values to standard CIE $XYZ_{SLS}$ (system light source) values (238), based on the reference system light source defined for the system. A Chromatic Adaptation Transform (240) is then applied to the CIE $XYZ_{SLS}$ values (238) to form visually corresponding CIE XYZ values (242) for a CIE Standard Observer chromatically adapted to the chromaticity of CIE Standard Illuminant $D_{50}$, using methods well known to those skilled in the art. Standard CIELAB equations (244) are then applied to complete the transformation of RGB image values to form a CIELAB D50 Image (246).

An ROI Pixel Averaging Operation (248) is next used to identify and collect pixels within the reference region of interest (ROI) specified by the Reference Spatial Coordinates (216), and the CIELAB values of these pixels are averaged to form Reference Average CIELAB Values (250). These averaged CIELAB values for the ROI of the photographic reference are then processed through a series of transforms to form the Reference Calibrated ROI Values (262). These transforms include CIELAB Equations (252), which transform the averaged CIELAB values to CIE XYZ D50 values (254), a Chromatic Adaptation Transform (256), which transforms the CIE XYZ D50 values to visually equivalent CIE $XYZ_{SLS}$ values (258), and a Reverse Reference Colorimetric Transform (260), which transforms CIE $XYZ_{SLS}$ values to the Reference Calibrated ROI RGB Values (262).

It should be noted that the average RGB values determined by this process, in which averaging is performed in CIELAB space, generally are significantly different from those obtained by directly averaging the linear RGB values themselves. The nonlinear conversion to CIELAB provides a better visual weighing of individual pixel values. For example, a small specular reflection from a tooth fissure might produce very high exposure values that could inappropriately increase the values of directly averaged RGB exposure values. The conversion to CIELAB values prior to averaging, followed by a conversion of averaged CIELAB values back to linear RGB values, greatly diminishes the effect of such unwanted influence, and the inclusion of this conversion and averaging is an important advantage of the present invention.

In the next step of the Shade Measurement Image Preparation process, the Reference Calibrated ROI RGB Values (262) are compared in an ROI Comparison Operation (264) to a set of predetermined Aim Reference Values (266) for the photographic reference on which the Reference Calibration Transform (232) was based, and RGB Correction Factors (268) are derived. Finally, these correction factors, which were discussed previously, are applied in an Exposure Correction Operation (270) to the RGB images values of the Calibrated Image File (230) to form the Exposure Corrected Calibrated RGB Image File (272).

FIG. 3 shows the signal-processing path used in performing the Shade Matching Process used for determining and specifying the shade of natural teeth, fabricated prostheses, and uncalibrated shade tabs. The process begins with the Exposure Corrected Calibrated RGB Image File (272), which was created using the Shade-Measurement Image Preparation path just described and shown in FIGS. 2A and 2B. In the first step of the Shade Matching Process, a manual or automatic Colorimetric Transform Selection (300) operation is used to select an appropriate transform for converting RGB values to CIE XYZ values. As discussed earlier, a principal advantage of the present invention is that it includes multiple calorimetric transformations, each based on a particular set of spectral reflectance properties associated with particular classes of objects such as natural teeth and various types of ceramics and other materials used in fabricating dental prostheses and shade tabs. The selected Colorimetric Transformation (302) is used to convert the RGB linear exposure values of the Exposure Corrected Calibrated RGB Image File (272) to CIE $XYZ_{SLS}$ tristimulus values (304), based on the actual light source of the system.

A Chromatic Adaptation Transform (306) is then applied to the CIE $XYZ_{SLS}$ values (304) to form a visually corresponding CIE XYZ Image (308) values for a CIE Standard Observer chromatically adapted to the chromaticity of CIE Standard Illuminant $D_{50}$. Standard CIELAB equations (310) are then applied to complete the transformation of RGB image values to CIELAB D50 values (312). A CIELAB Image File (314) of the CIELAB image data is created and stored in a suitable file format (e.g., JPEG) for later use in creating images for monitor display. An ROI Pixel Averaging Operation (316) is then used to identify and collect pixels within the object region of interest (ROI) specified by the Object Spatial Coordinates (218) to form Object ROI CIELAB Values (318). Standard CIELAB transformation equations (320) are then used to transform the Object ROI CIELAB Values (318) to Object ROI LCH Values (322), where L, C, and H respectively refer to Lightness, Chroma, and Hue.

The LCH values (322) are used in a Shade Matching Algorithm (326) for comparing the colorimetry of the object ROI to the colorimetry of each shade tab, which is stored in a Shade Tab Database (324). Lightness, Chroma, and Hue values are well suited for such comparisons. For example, defining an error objective function for the matching algorithm in terms of LCH values allows the use of simple weighting factors that represent the relative importance of the color attributes represented by these values. Such weighting is important because natural teeth are rarely matched perfectly by a single shade tab. Thus determining which shade tab provides the smallest mismatch is a matter of interpretation.

In addition, there are other factors involved in selecting the best shade-tab match. For example, many dental technicians prefer to base the color of a prosthesis on a shade tab that is slightly lighter and slightly lower in chroma than the tooth being matched. There are two reasons for this. First, prostheses can be darkened and their chroma can be increased after initial fabrication; but they cannot be lightened or reduced in chroma. Thus, starting from a shade tab color that is slightly light and low in chroma provides a margin of safety. Second, most practitioners have found that their patients are more willing to accept, and sometimes prefer, prostheses that are slightly lighter and slightly lower in chroma than the patient's natural tooth color. In view of this, the decision algorithm (326) of the preferred embodiment incorporates Selectable Sets of Parameters (325) representing weighting factors and other parameters that can reflect particular preferences for preferred visual calorimetric correspondence. The preferred system additionally provides for the inclusion of multiple sets of these algorithm parameters so as to accommodate the particular preferences of multiple users or objectives. Included in the algorithm parameters are level-independent and level-dependent error-penalty weighting factors for lightness, chroma, and hue. The level-independent weighting factors control the relative importance of these color attributes. For example, to match the results of most practitioners, lightness must be weighted more heavily than hue or chroma in determining the shade-matching decision. The level-dependent weighting factors are used to affect the direction of the decision. For example, the lightness error penalty can be made larger if the tab lightness is lower than that of the tooth (i.e., the tab is darker than the tooth) but smaller if the tab lightness is higher than that of the tooth. Lightness, chroma, and hue offset parameters are also included. These offsets can be used to further reflect particular user preferences and/or to compensate for any consistent differences between the system matches and those of a particular practitioner. Such differences could result from small system calibration errors, observer metamerism, and other factors.

One result of the matching algorithm (326) is a Shade Match (328). In this preferred embodiment, the shade-match result includes the color difference, computed according to the matching algorithm, for each shade tab in the database. Note that in most cases, even the closest shade tab will show some color difference from the tooth being matched. This is not a failure of the system; it reflects the fact that no shade tab in the system database happens to be a perfect visual match for the particular tooth being measured. In some cases, the match between the "best" available shade tab and the tooth may be completely unacceptable. In view of this, an important and novel second feature of the matching algorithm is that it determines a specification of the degree of matching. This Degree of Match Specification (330) can be reported as an overall numerical color-difference value, and/or in terms of graphical representations, and/or in terms of corresponding verbal descriptions of the overall match, such as "nearly perfect", "acceptable", etc., based on the color difference value. Alternatively, or in addition, the numerical or other degree-of-match descriptions may describe the matching in greater detail. For example, a match might be described as "excellent for lightness", "slightly low in chroma", and "very slightly red in hue". Such descriptions can be derived from the weighted numerical differences in computed lightness, chroma, and hue.

FIG. 4 shows the signal-processing path for producing reflection prints or other hard copy or electronic output of supplemental images. Like the Shade-Measurement Image Preparation path shown in FIGS. 2A and 2B, this process begins with a DCR Image File from the DCS760 camera. However, Supplemental-Type Image DCR Files (400) correspond to supplemental photographs, described earlier, made using lighting geometry that emphasizes secondary tooth characteristics such as gloss and texture. In the first step of the signal processing, 12-bit linear RGB data is extracted by an RGB Extraction operation (402) from a Supplemental-Type Image DCR File (400) to form a 12-bit linear Camera RGB File (404). A Calibration Transform (406), which provides compensation for camera and light sources, is then applied to form a Calibrated Linear RGB Image File (408). A Colorimetric Transform (410) is then used to transform the Calibrated Linear RGB Image File (408) to CIEXYZ tristimulus values. Although the Colorimetric Transform (410) serves the same function as the Reference Colorimetric Transform (236) in the Shade-Measurement Image Preparation path of FIG. 2B, it is derived differently. The Reference Colorimetric Transform (236) was derived using a very restricted set of color stimuli based heavily on the spectral reflectance characteristics of the reference medium and the spectral power distribution of the system light source. This restriction results in a specialized transformation that provides highly accurate RGB-to-XYZ conversion for reference pixel values. The Colorimetric Transform (410), on the other hand, is applied to all pixels of the supplemental images. It is derived using a broad range of colors, with particular emphasis on the colors of teeth, skin, lips, and gums. Application of the Colorimetric Transform (410) results in a CIE $XYZ_{SLS}$ Image file (412), the values of which are based on the light source of the system. A Chromatic Adaptation Transform (414) is then used to produce the visually equivalent CIEXYZ $D_{50}$ values of an XYZ D50 Image (416).

The resulting image data can be saved in any of a plurality of image file formats such as a JPEG2000 File (418) for various purposes, including subsequent electronic display. The XYZD50 Image (416), or XYZ image data retrieved from the Image File (418), can be printed on any of a plurality of printer types, such as those based on ink jet, thermal transfer, electrophotography, silver halide, or other image-forming technologies. To produce image digital code values for a given printer, the system of this preferred embodiment uses the following output signal processing: a Color Processor (422) applies a Printer Characterization Transform (420), which converts the XYZD50 Image (416) values to Reference Printer Code Values (424) for a defined reference printer of the same basic type as the actual printer, i.e., a System Printer (432), to be used. A Color Processor (426) is then used to apply a Calibration Transform (428) to the Reference Printer Code Values (424). The Calibration Transform (428), which may consist of three or more one-dimensional lookup tables, accounts for any differences in the printing characteristics of the actual output printer from those of the reference printer. Application of this transform produces the final Printer Code Values (430), which are sent to a System Printer (432) to produce a Supplemental Image (434).

The system described in this preferred embodiment has been evaluated for two types of experiments. The first involves matching shade tabs to a database constructed from images of those tabs. In this type of experiment, the correct answer is known with certainty. If, for example, a VITA™ A3 shade tab is photographed and evaluated, the system should determine that the closest matching tab is a VITA™ A3. This type of testing allowed the overall system and its various components to be evaluated for both accuracy and precision. Extensive testing has shown that, in this type of test, the system selects the proper shade match virtually 100% of the time. The second type of test involves shade matching natural and prosthetic teeth of human subjects to the database of shade tab images. For a number of reasons, this is a more complex experiment to run. For example, placement of the intra-oral reference and positioning of the teeth within the illuminated field are likely to be more variable when live subjects are involved. Moreover, natural teeth are rarely matched perfectly by a single shade tab. Thus the "correct" answer, i.e., which shade tab provides the smallest mismatch, is subject to interpretation and preferences. When the decision algorithm is adjusted to include the personal preferences of a given technician, the system selects the same shade matches as that technician virtually 100% of the time.

This application has described a dental shade-matching system having a number of features, which combine to produce a level of overall system performance that exceeds that of any currently available dental shade-matching system. In summary, the described system includes the following features:

The system produces high-resolution digital images using two distinct types of lighting. The first lighting arrangement minimizes or eliminates specular reflections within the area of measurement, thus allowing accurate shade measurements to be made. The second lighting arrangement produces images that accurately convey supplemental information such as tooth texture, gloss, and other details.

The system incorporates a unique intra-oral reference. The optical properties of the front surface of this reference are specifically designed to be well correlated with those of natural teeth. Use of this novel reference allows highly precise and accurate tooth color measurements to be made under conditions that are inherently complex and variable.

The system incorporates novel camera calorimetric calibration and characterization transformations. In particular, in order to provide the degree of accuracy required for this application, the system includes the use of multiple colorimetric transformations, each based on one specific subset of colors (e.g., natural teeth, shade tabs, prosthetic ceramics, etc.). Additionally, colorimetric calibration is provided for each individual camera, each individual set of shade tabs, and each individual intra-oral reference.

The system incorporates a shade tab database built using images of shade tabs photographed with artificial gums and with a background that simulates the human mouth. This unique database allows valid colorimetric measurements comparisons and visual color assessments to be made between shade-tab images and images of natural teeth.

The system includes decision algorithms that automatically determine the closest shade-tab match to one or more areas of a specified tooth. The degree of match is indicated in terms of a numerical values, and/or graphical representations, and/or corresponding verbal descriptions. Optionally, the matching is also determined for any number of other shade tabs in the database, and the results are listed in rank order. The decision algorithm of the system includes parameters that can be adjusted to correspond with various shade-tab selection preferences and objectives. Multiple sets of parameters values, each corresponding to the preferences of a particular user or situation, can be stored and selected for use.

The system provides for on-screen visual comparison of the measured tooth to the selected shade tab or to any other shade tab in the database. The system provides for visualization of a proposed prosthesis within an image of the patient's mouth. A simulated prosthetic image is created using geometric and other information, from an image of a patient's tooth or from another source, together with calorimetric information derived from the proposed matching shade tab.

The system provides enhanced visualization to simplify comparisons by providing a monochrome mode for evaluating lightness, one or more enhanced-chroma modes for evaluating hue, and a mode that simulates the effects of increased viewing distance and squinting.

The system includes procedures for measuring a completed prosthesis to either verify that its color meets specifications or, if not, to quantify the color changes required to meet those specifications.

The system includes a procedure for mapping and compensating for lighting non-uniformity.

The system includes a matching algorithm based on comparisons of regions of interest that are selectable in number and location.

The system includes pattern and color recognition algorithms that greatly simplify and/or fully automate the user task of locating and sizing regions of interest.

The system includes a standardized set of shade-tab calorimetric values and a corresponding set of computer-generated shade tab images, which can serve as a standard for determining and communicating color specifications.

This invention and a preferred embodiment have been described in detail with reference to the figures and diagrams. It will be appreciated that numerous variations and modifications are possible within the spirit and scope of the invention. For example, the invention has been described with reference to the use of electronic image capture devices for photographing natural teeth, dental shade tabs, and dental prostheses. However, image capture could be accomplished using other image-capture technologies such as conventional photographic films and cameras. Images captured on a film could be scanned, and the resulting scanner image-bearing signals could be signal processed using the methods described by Giorgianni et al. in commonly-assigned U.S. Pat. No. 5,267,030 to form film RGB exposure values. These values would be equivalent to the RGB device image values discussed in the present invention. With the application of appropriate colorimetric transforms, the film RGB exposure values could be transformed to the visual colorimetric values used throughout this invention. In addition, the invention has been described with reference to shade matching dental prostheses and natural teeth, but it could also be used for determining or selecting the color of a matching bonding material. It will also be appreciated that it is possible to apply the methods and means of the invention to a wide variety of applications other than dental shade matching. Fundamentally, the invention describes novel methods and means for accurately and precisely determining visual colorimetric values of simple or complex objects at high spatial resolutions, using an image capture device having spectral sensitivities that may not correspond to a set of visual color matching functions, and for comparing the determined visual colorimetric values to a database of reference visual calorimetric values derived from simple or complex objects. Thus many other possible applications of the invention would be feasible including, but not limited to, medical diagnostics (e.g., screening for oral or skin cancer), cosmetics (e.g., selecting a makeup color to match a particular skin tone), color-based quality control (e.g., evaluating the colorimetry of objects, printed patterns, etc. during production), and many other applications where highly accurate color determinations and specifications are important.

PARTS LIST

10 Object
20 Electronic Capture Device
25 RGB Image Device Values
27 Transform Database
30 Colorimetric Transform Selection
40 Colorimetric Transformation
50 Object Visual Colorimetric Values
60 Color Reference Database
70 Matching Operation
80 Shade Match Specification
90 Display and Adjustment Stage
200 Matching-Type Image DCR File
202 Extraction Operation
204 12-bit Linear Camera RGB Image File
206 Display Transform
208 Color Processor
210 Display Image File
212 Display Device
214 Region of Interest (ROI) Selection Operation
216 Reference Spatial Coordinates
218 Object Spatial Coordinates
220 Region of Interest Selection Operation
222 Uniformity Correction Map
224 Uniformity Correction Operation
226 Uniformity Corrected Image File 228 Calibration Transformation
230 Calibrated Image File
232 Reference Calibration Transform
234 Reference Calibrated Image File
236 Reference Colorimetric Transform
238 CIE $XYZ_{SLS}$ Values
240 Chromatic Adaptation Transform
242 CIE XYZ Values
244 CIELAB Equations
246 CIELAB D50 Image
248 ROI Pixel Averaging Operation
250 Reference Average CIELAB Values
252 CIELAB Equations
254 CIE XYZ D50 Values
256 Chromatic Adaptation Transform
258 CIELAB $XYZ_{SLS}$ Values
260 Reverse Reference Colorimetric Transform
262 Referenced Calibrated Region of Interest RGB Values
264 Reference ROI Comparison Operation
266 Aim Reference Values
268 RGB Correction Factors
270 Exposure correction Operation
272 Exposure Corrected Calibrated RGB Linear Image File
300 Colorimetric Transform Selection
302 Selected Colorimetric Transform
304 CIE $XYZ_{SLS}$ tristimulus values
306 Chromatic Adaptation Transform
308 CIE $XYZ_{D50}$ Image
310 CIELAB equations
312 CIELAB D50 values
314 CIELAB Image File
316 ROI Pixel Averaging Operation
318 Object ROI CIELAB Values
320 CIELAB transformation equations
322 Object ROI LCH Values
324 Shade Tab Database
325 Selectable Sets of Parameters
326 Shade Matching Algorithm
328 Shade Match
330 Degree of Shade Match Specification
400 Supplemental-Type Image DCR Files
402 RGB Extraction Operation
404 12-bit linear camera RGB File
406 Calibration Transform
408 Calibration Linear RGB Image File
410 Colorimetric Transform
412 CIE $XYZ_{SLS}$ Image File
414 Chromatic Adaptation Transform
416 CIEXYZ$_{D50}$ Image
418 Image File
420 Printer Characterization Transform
422 Color Processor
424 Reference Printer Code Values
426 Color Processor
428 Calibration Transform
430 Printer Code Values
432 System Printer
500 Uniformly Illuminated Tooth
502 Intra-oral reference
504 Photographed intra-oral reference
510 Uniformly Illuminated Dental Prosthesis
512 Known reference
514 Background
516 Cap included on dental prosthesis
518 Photographed known reference
520 Uniformly illuminated reference shade sample
522 Known reference
524 Background
526 Cap included on reference shade sample
528 Photographed known reference

What is claimed is:

1. A method for determining visual calorimetric values for an object having particular spectral reflectance characteristics, said method comprising the steps of:
    (a) photographing an object with an electronic image capture device to form device image values;
    (b) selecting a transform from a plurality of transforms for converting the device image values to visual colorimetric values, wherein the selection of said transform is based on the particular spectral reflectance characteristics of said object; and
    (c) applying the selected transform to said device image values to determine said visual calorimetric values for said object.

2. The method of claim 1 further comprising the steps of:
    (d) comparing said visual colorimetric values for said object to visual colorimetric values for each of a plurality of color references; and
    (e) selecting one or more color references having a preferred visual colorimetric correspondence to said object.

3. The method of claim 2 wherein at least one of steps (d) and (e) uses a mathematical algorithm that includes a set of parameters associated with individual calorimetric attributes that are used for selecting the one or more color references having a preferred visual calorimetric correspondence to said object.

4. The method of claim 3 wherein the set of parameters includes a plurality of selectable sets of parameters, each set representing different criteria for preferred visual calorimetric correspondence.

5. The method of claim 2 further comprising the steps of:
    (f) determining and specifying the degree of visual colorimetric correspondence between the one or more selected color references and said object; and
    (g) indicating the degree of visual calorimetric correspondence between the selected one or more color references and said object in terms of at least one of numerical values, graphical illustrations, and verbal descriptions.

6. The method of claim 2 wherein step (d) comprises a visual comparison of said visual calorimetric values for said object to visual calorimetric values for each of a plurality of color references, wherein a complete or partial image of said object is shown immediately adjacent to or in close proximity to a complete or partial image corresponding to the calorimetric values of the one or more selected color references.

7. The method of claim 5 wherein said degree of visual colorimetric correspondence between the one or more selected color references and said object is shown as a complete or partial image of said object immediately adjacent to or in close proximity to a complete or partial image corresponding to the colorimetric values of the one or more selected color references.

8. The method of claim 6 wherein said complete or partial image corresponding to the colorimetric values of the one or more selected color references can be adjusted by a human operator.

9. The methods of claim 6 wherein the object and reference images are displayed in a monochrome mode.

10. The methods of claim 6 wherein chroma of the object and reference images is displayed in a mode in which the displayed chroma is increased similarly for all colors.

11. The method of claim 6 wherein chroma of the object and reference images is displayed in a mode in which the displayed chroma of colors is increased in inverse proportion to their original chroma.

12. The methods of claim 6 wherein the object and reference images are displayed at reduced spatial resolution.

13. The method of claim 7 wherein said complete or partial image corresponding to the colorimetric values of the one or more selected color references can be adjusted by a human operator.

14. The methods of claim 7 wherein the object and reference images are displayed in a monochrome mode.

15. The methods of claim 7 wherein chroma of the object and reference images is displayed in a mode in which the displayed chroma is increased similarly for all colors.

16. The method of claim 7 wherein chroma of the object and reference images is displayed in a mode in which the displayed chroma of colors is increased in inverse proportion to their original chroma.

17. The methods of claim 7 wherein the object and reference images are displayed at reduced spatial resolution.

18. A method for determining and specifying one or more shades of a natural tooth by comparing visual colorimetric values of a measurement image of said tooth to a database of visual colorimetric values of reference shades, said method comprising the steps of:
   (a) uniformly illuminating at least one natural tooth in a manner that minimizes or eliminates specular reflections for a front surface of said tooth;
   (b) including an intra-oral reference within the measurement image;
   (c) photographing the intra-oral reference together with said tooth with a digital camera to form camera image values;
   (d) using the camera image values for the intra-oral reference to correct the camera image values for errors in exposure due to lighting or camera variations, thereby providing corrected camera image values;
   (e) applying a transform based on the spectral reflectance characteristics of natural teeth to convert the corrected camera image values to visual colorimetric values;
   (f) specifying pixel locations corresponding to one or more areas of said tooth for which the one or more shades are to be determined;
   (g) comparing the visual calorimetric values for said pixel locations to the visual colorimetric values of the database of visual colorimetric values of reference shades; and
   (h) determining one or more reference shades based on their correspondence to the visual colorimetric values for said pixel locations corresponding to said one or more areas of said tooth.

19. The method as claimed in claim 18 wherein the intra-oral reference used in step (b) includes optical properties that correlate with those of natural teeth.

20. A method for determining and specifying one or more shades of a dental prosthesis by comparing visual colorimetric values of a measurement image of said dental prosthesis to a database of visual colorimetric values of reference shades, wherein said dental prosthesis is fabricated of particular types of dental materials having particular spectral reflectance characteristics, said method comprising the steps of:
   (a) uniformly illuminating a dental prosthesis in a manner that minimizes or eliminates specular reflections from a front surface of the dental prosthesis;
   (b) including a known reference within the measurement image;
   (c) including a background within the measurement image, wherein said background simulates the geometric and color characteristics of a human mouth;
   (d) including a cap on said dental prosthesis, wherein said cap simulates the geometric and color characteristics of human gums;
   (e) photographing said known reference with said dental prosthesis, background, and cap with a digital camera to form camera image values;
   (f) using said camera image values of said known reference to correct for errors in exposure due to lighting and/or camera variations, thereby providing corrected camera image values;
   (g) applying a transform based on the particular spectral reflectance characteristics of the particular types of dental materials from which said dental prosthesis was fabricated to convert the corrected camera image values to visual colorimetric values;
   (h) specifying pixel locations corresponding to one or more areas of said dental prosthesis for which the one or more shades are to be determined;
   (i) comparing the visual calorimetric values for said pixel locations to the visual colorimetric values of the database of visual colorimetric values of reference shades; and
   (j) determining one or more reference shades based on their correspondence to the visual colorimetric values for said pixel locations corresponding to said one or more areas of said dental prosthesis.

21. A method for determining visual colorimetric values of a reference shade sample from a measurement image, wherein said reference shade sample is fabricated of particular types of materials having particular spectral reflectance characteristics, said method comprising the steps of:
   (a) uniformly illuminating a reference shade sample in a manner that minimizes or eliminates specular reflections from a front surface of the reference shade sample;
   (b) including a known reference within the measurement image;
   (c) including a background within the measurement image, wherein said background simulates the geometric and color characteristics of a human mouth;
   (d) including a cap on said reference shade sample, wherein said cap simulates the geometric and color characteristics of human gums;
   (e) photographing said known reference together with said reference shade sample, background, and cap with a digital camera to form camera image values;
   (f) using said camera image values for said known reference to correct image values for errors in exposure due to lighting and/or camera variations, thereby providing corrected camera image values;
   (g) applying a transform based on the particular spectral reflectance characteristics of the particular types of materials from which said reference shade sample is fabricated to convert the corrected camera image values to visual colorimetric values;
   (h) specifying pixel locations corresponding to one or more areas of said reference shade sample for which visual colorimetric values are to be determined; and
   (i) determining the visual calorimetric values for said areas of said reference shade sample.

22. The method of claim 21 wherein the reference shade sample is a dental shade tab.

23. The method of claim 21 further comprising the steps of:
- (j) repeating steps (a) through (g) for a plurality of reference shade samples of a same basic type, thereby producing corresponding visual colorimetric values for each reference shade sample of a same basic type; and
- (k) averaging the corresponding visual calorimetric values determined for all samples of the same basic type to obtain visual colorimetric values for a reference shade of that type.

24. A method for generating an image of a simulated dental prosthesis for display on a display device, said method comprising the steps of:
- (a) specifying desired visual calorimetric values for one or more areas of a prosthesis that is to be simulated;
- (b) adjusting the visual colorimetric values of an image of a similar natural tooth, prosthesis or shade tab to correspond to said desired visual calorimetric values; and,
- (c) transforming the adjusted visual colorimetric values of the image to display device signal values; and
- (d) using said display device signal values to display an image corresponding to said simulated dental prosthesis.

25. The method of claim 24 further comprising the steps of:
- (e) adjusting a size and shape of the displayed image of said simulated dental prosthesis; and
- (f) placing the displayed image of said simulated dental prosthesis appropriately within a displayed image of a mouth to create a visualization of the appearance of the dental prosthesis within the mouth, thereby generating a placed display image having particular visual colorimetric values.

26. The method of claim 25 further comprising the steps of:
- (g) adjusting the particular visual colorimetric values of the placed displayed image of said simulated dental prosthesis displayed within the displayed image of a patient's mouth, thereby generating adjusted visual calorimetric values; and
- (h) indicating the adjusted visual calorimetric values in terms of at least one of numerical values, shade tab specifications, graphical illustrations and verbal descriptions.

27. A system for determining visual calorimetric values for an object having particular spectral reflectance characteristics, said system comprising:
- an electronic capture device for photographing an object and obtaining device image values corresponding to the object;
- a transform selector for selecting a transform from a plurality of transforms for converting the device image values to visual colorimetric values, wherein the selection of said transform is based on the particular spectral reflectance characteristics of said object; and
- a transform processing stage for applying the selected transform to said device image values to determine said visual colorimetric values for said object.

* * * * *